United States Patent
Ide et al.

(10) Patent No.: US 6,586,121 B2
(45) Date of Patent: Jul. 1, 2003

(54) SPIN-VALVE THIN-FILM MAGNETIC ELEMENT

(75) Inventors: Yosuke Ide, Niigata-ken (JP); Masamichi Saito, Niigata-ken (JP); Kenichi Tanaka, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 88 days.

(21) Appl. No.: 09/862,738

(22) Filed: May 22, 2001

(65) Prior Publication Data

US 2002/0006530 A1 Jan. 17, 2002

(30) Foreign Application Priority Data

May 30, 2000 (JP) ........................................ 2000-160992

(51) Int. Cl.[7] .................................................. G11B 5/66
(52) U.S. Cl. ....................... 428/692; 428/611; 428/622; 428/627; 428/629; 428/632; 428/639; 428/641; 428/660; 428/607; 428/670; 428/678; 428/900; 360/113; 324/252
(58) Field of Search ................................ 428/611, 622, 428/627, 629, 632, 639, 641, 660, 607, 670, 678, 692, 800; 360/113; 324/252

(56) References Cited

U.S. PATENT DOCUMENTS

| | | | |
|---|---|---|---|
| 5,422,571 A | * | 6/1995 | Gurney ........................ 329/252 |
| 5,688,605 A | * | 11/1997 | Iwasaki ........................ 428/611 |
| 5,949,622 A | | 9/1999 | Kamiguchi et al. ..... 360/324.12 |

* cited by examiner

Primary Examiner—Leszek Kiliman
(74) Attorney, Agent, or Firm—Brinks Hofer Gilson & Lione

(57) ABSTRACT

A spin-valve thin-film magnetic element includes a substrate; an antiferromagnetic layer; a pinned magnetic layer in contact with the antiferromagnetic layer, the magnetization direction of the pinned magnetic layer being pinned by an exchange coupling magnetic field with the antiferromagnetic layer; a nonmagnetic conductive layer in contact with the pinned magnetic layer; a free magnetic layer in contact with the nonmagnetic conductive layer, the magnetization direction of the free magnetic layer being aligned in a direction perpendicular to the magnetization direction of the pinned magnetic layer; and a back layer composed of a nonmagnetic conductive material formed in contact with the free magnetic layer at the opposite side of the nonmagnetic conductive layer. The back layer is composed of at least one metal selected from the group consisting of Ru, Pt, Ir, Rh, Pd, Os, and Cr.

16 Claims, 11 Drawing Sheets

SPIN-VALVE THIN-FILM MAGNETIC ELEMENT

BACKGROUND OF THE INVENTION

1. Field of the Invention

The present invention relates to a spin-valve thin-film magnetic element in which electrical resistance changes due to the relationship between the pinned magnetization direction of a pinned magnetic layer and the magnetization direction of a free magnetic layer which is influenced by an external magnetic field, and to a thin-film magnetic head provided with the spin-valve thin-film magnetic element. More particularly, the invention relates to a technique which can improve the rate of resistance change and which can decrease the coercive force of the free magnetic layer.

2. Description of the Related Art

A spin-valve thin-film magnetic element is one type of giant magnetoresistive (GMR) element exhibiting a giant magnetoresistance effect, and detects a recorded magnetic field from a magnetic recording medium, such as a hard disk.

The spin-valve thin-film magnetic element has a relatively simple structure among GMR elements, and has a high rate of resistance change relative to an external magnetic field, thus, the resistance changes in response to a weak magnetic field.

FIG. 11 is a sectional view of a conventional spin-valve thin-film magnetic element, viewed from a surface facing a recording medium (air bearing surface; ABS).

The spin-valve thin-film magnetic element shown in FIG. 11 is a so-called "top-type" single spin-valve thin-film magnetic element in which an antiferromagnetic layer, a pinned magnetic layer, a nonmagnetic conductive layer, and a free magnetic layer, one each, are deposited.

For the spin-valve thin-film magnetic element, a magnetic recording medium, such as a hard disk, travels in the Z direction in the drawing, and a fringing magnetic field from the magnetic recording medium is directed in the Y direction.

As shown in FIG. 11, an underlying layer 121 is provided on a substrate. A free magnetic layer 125, a nonmagnetic conductive layer 124, a pinned magnetic layer 123, an antiferromagnetic layer 122, and a protective layer 127 are formed in that order on the underlying layer 121.

Hard bias layers 126 are provided on both sides, in the track width (Tw) direction, of the underlying layer 121, the pinned magnetic layer 123, the nonmagnetic conductive layer 124, and the free magnetic layer 125, and electrode layers 128 are formed on the hard bias layers 126. Reference numeral 129 represents a laminate, which has a trapezoidal cross-section, including the underlying layer 121, the free magnetic layer 125, the nonmagnetic conductive layer 124, the pinned magnetic layer 123, the antiferromagnetic layer 122, and the protective layer 127.

In the spin-valve thin-film magnetic element, the magnetization direction of the pinned magnetic layer 123 is pinned antiparallel to the Y direction.

The underlying layer 121 is composed of tantalum (Ta) or the like, and the antiferromagnetic layer 122 is composed of an IrMn alloy, an FeMn alloy, an NiMn alloy, or the like. The pinned magnetic layer 123 and the free magnetic layer 125 are composed of Co, an NiFe alloy, or the like, the nonmagnetic conductive layer 124 is composed of copper (Cu), the hard bias layers 126 are composed of a cobalt-platinum (Co—Pt) alloy, and the electrode layers 128 are composed of a good conductor, such as Cu. In the spin-valve thin-film magnetic element having the structure shown in FIG. 11, the free magnetic layer 125 has a layered structure including an NiFe layer 125A and a Co layer 125B which is in contact with the nonmagnetic conductive layer 124.

FIG. 12 is a sectional view of another conventional spin-valve thin-film magnetic element, viewed from a surface facing a recording medium (ABS).

The spin-valve thin-film magnetic element shown in FIG. 12 is a so-called "bottom-type" single spin-valve thin-film magnetic element in which an antiferromagnetic layer, a pinned magnetic layer, a nonmagnetic conductive layer, and a free magnetic layer, one each, are deposited.

For the spin-valve thin-film magnetic element, a magnetic recording medium, such as a hard disk, travels in the Z direction in the drawing, and a fringing magnetic field from the magnetic recording medium is directed in the Y direction.

The conventional spin-valve thin-film magnetic element shown in FIG. 12 includes a laminate 109 in which an underlying layer 106, an antiferromagnetic layer 101, a pinned magnetic layer 102, a nonmagnetic conductive layer 102, a free magnetic layer 104, and a protective layer 107 are deposited in that order on a substrate, a pair of hard bias layers 105, and electrode layers 108 formed on the hard bias layers 105.

The underlying layer 106 is composed of Ta or the like, and the antiferromagnetic layer 101 is composed of an NiO alloy, an FeMn alloy, an NiMn alloy, or the like. The pinned magnetic layer 102 and the free magnetic layer 104 are composed of Co, an NiFe alloy, or the like, the nonmagnetic conductive layer 103 is composed of Cu, the hard bias layers 105 are composed of a Co—Pt alloy, and the electrode layers 108 are composed of a good conductor, such as Cu.

Since the pinned magnetic layer 102 is formed in contact with the antiferromagnetic layer 101, an exchange coupling magnetic field (exchange anisotropic magnetic field) is produced at the interface between the pinned magnetic layer 102 and the antiferromagnetic layer 101, and the pinned magnetization of the pinned magnetic layer 102 is pinned, for example, in the Y direction in the drawing.

Since the hard bias layers 105 are magnetized in the X1 direction in the drawing, the variable magnetization of the free magnetic layer 104 is aligned in the X1 direction. Thereby, the variable magnetization of the free magnetic layer 104 and the pinned magnetization of the pinned magnetic layer 102 are perpendicular to each other.

The free magnetic layer 104 includes an NiFe sub-layer 104A and a Co sub-layer 104B which is in contact with the nonmagnetic conductive layer 103.

In the spin-valve thin-film magnetic element shown in FIG. 12, a sensing current is applied from the electrode layer 108 formed on the hard bias layer 105 to the pinned magnetic layer 102, the nonmagnetic conductive layer 103, and the free magnetic layer 104. A magnetic recording medium, such as a hard disk, travels in the Z direction in the drawing, and when a fringing magnetic field from the magnetic recording medium is applied in the Y direction, the magnetization direction of the free magnetic layer 104 is rotated from the X1 direction to the Y direction. At this stage, electrical resistance changes due to the relationship between the varied magnetization direction of the free magnetic layer 104 and the pinned magnetization direction of the pinned magnetic layer 102, which is referred to as a magnetoresistance (MR) effect, and the fringing magnetic field from the magnetic recording medium is detected by a voltage change based on the change in the electrical resistance.

With respect to the spin-valve thin-film magnetic element shown in FIG. 11, a structure has been proposed, in which a back layer composed of a nonmagnetic conductive material, such as Au, Ag, or Cu, is formed at the underlying layer 121 side of the free magnetic layer 125 so that the mean free path of spin-up electrons, that contribute to the magnetoresistive effect, is extended, that is, a so-called "spin filter effect" is used, thus enabling to obtain a large rate of resistance change ($\Delta R/R$).

However, in the structure shown in FIG. 11, when a back layer composed of Cu is added between the free magnetic layer 125 and the underlying layer 121 composed of Ta, if the Cu back layer is deposited at a thickness of approximately several ten angstroms on the Ta underlying layer 121, it is difficult to deposit the back layer of Cu with satisfactory crystal orientation, resulting in a decrease in orientation of the back layer, and thus it is difficult to obtain a large rate of resistance change ($\Delta R/R$). Additionally, irregularities are likely to occur on the back layer formed on the Ta underlying layer 121, and the free magnetic layer 125, the nonmagnetic conductive layer 124, the pinned magnetic layer 123, and the antiferromagnetic layer 122 formed on the irregular back layer are likely to have uneven thicknesses, and thus it is difficult to obtain a spin-valve thin-film magnetic element exhibiting a high magnetoresistance effect.

With respect to the spin-valve thin-film magnetic element shown in FIG. 12, the protective layer 107 composed of Ta is usually deposited on the free magnetic layer 104, and if the free magnetic layer 104 is composed of an NiFe alloy, a thermal diffusion of elements tends to occur at the interface between the Ta layer and the NiFe alloy layer. If the diffusion of elements is caused by heating at the interface between the free magnetic layer 104 and the protective layer 107, the magnetic thickness (Ms·t) of the free magnetic layer 104 is decreased. Moreover, the dispersion of magnetic anisotropy increases in the vicinity of the interface between the protective film 107 and the free magnetic layer 104, and there is a possibility that the coercive force of the free magnetic layer 104 increases and the rate of resistance change decreases.

Additionally, although the present inventors have proposed a so-called "synthetic-ferri-pinned type" spin-valve thin-film magnetic element in which a pinned magnetic layer is divided by a nonmagnetic intermediate layer into a plurality of layers, there is also a possibility that the problems in the free magnetic layer as described above arise in such a structure.

SUMMARY OF THE INVENTION

Accordingly, it is an object of the present invention to provide a spin-valve thin-film magnetic element provided with a back layer, in which the crystal orientation of the back layer is improved and the rate of resistance is improved. It is another object of the present invention to provide a spin-valve thin-film magnetic element in which the coercive force of a free magnetic layer adjacent to a back layer is decreased, soft magnetic properties are improved, and sensitivity is improved.

It is another object of the present invention to provide a bottom-type spin-valve thin-film element, in which a decrease in the magnetic thickness of a free magnetic layer is prevented, an increase in the dispersion of magnetic anisotropy at the interface between the free magnetic layer and a protective layer is prevented, an increase in the coercive force of the free magnetic layer is prevented, and a decrease in the rate of resistance change is inhibited.

It is another object of the present invention to provide a thin-film magnetic head provided with the spin-valve thin-film magnetic element as described above.

In accordance with the present invention, a spin-valve thin-film magnetic element includes a substrate; an antiferromagnetic layer; a pinned magnetic layer in contact with the antiferromagnetic layer, the magnetization direction of the pinned magnetic layer being pinned by an exchange coupling magnetic field with the antiferromagnetic layer; a nonmagnetic conductive layer in contact with the pinned magnetic layer; a free magnetic layer in contact with the nonmagnetic conductive layer, the magnetization direction of the free magnetic layer being aligned in a direction perpendicular to the magnetization direction of the pinned magnetic layer; and a back layer composed of a nonmagnetic conductive material formed in contact with the free magnetic layer at the opposite side of the nonmagnetic conductive layer. The back layer is composed of at least one metal selected from the group consisting of Ru, Pt, Ir, Rh, Pd, Os, and Cr.

When the back layer is composed of the metal or the alloy described above, the back layer can easily have a satisfactory crystal orientation, and the lattice matching at the interface between the back layer and the free magnetic layer can be satisfactorily set, and thus the spin filter effect of the back layer for selecting spin-up electrons can be satisfactorily exhibited, resulting in a high rate of resistance change.

Prior to describing a reason for an increase in the rate of magnetoresistance change due to the spin filter effect, the principle of a giant magnetoresistance effect of a spin-valve thin-film magnetic element will be briefly described below.

When a sensing current is applied to a spin-valve thin-film magnetic element, conduction electrons mainly move in the vicinity of the nonmagnetic conductive layer having a small electrical resistance. Theoretically, two types of conduction electrons are present in equal quantity, namely, spin-up conduction electrons and spin-down conduction electrons.

The rate of magnetoresistance change of the spin-valve thin-film magnetic element has a positive correlation with a difference in the mean free path between the two types of conduction electrons.

The spin-down conduction electrons are always scattered at the interface between the nonmagnetic conductive layer and the free magnetic layer regardless of the direction of an applied external magnetic field, and the probability of transferring to the free magnetic layer remains low, and the mean free path of the spin-down conduction electrons remains shorter than that of the spin-up electrons.

In contrast, the spin-up conduction electrons have an increased probability of transferring from the nonmagnetic conductive layer to the free magnetic layer when the magnetization direction of the free magnetic layer is set parallel to the magnetization direction of the pinned magnetic layer by an external magnetic field, and the mean free path is increased. As the magnetization direction of the free magnetic layer is varied from a state parallel to the magnetization direction of the pinned magnetic layer due to an external magnetic field, the probability of being scattered at the interface between the nonmagnetic conductive layer and the free magnetic layer is increased and the mean free path of the spin-up conduction electrons is decreased.

As described above, the mean free path of the spin-up conduction electrons greatly changes in comparison with the mean free path of the spin-down conduction electrons, and the difference between the two mean free paths is greatly changed, and thus the resistivity is changed, and the rate of magnetoresistance change (ΔR/R) of the spin-valve thin-film magnetic element is increased.

If the back layer is deposited on the free magnetic layer at the side opposite of the nonmagnetic conductive layer, the back layer forms a potential barrier at the interface with the free magnetic layer, thus enabling the extension of the mean free path of the spin-up conduction electrons passing through the free magnetic layer. That is, since the so-called "spin filter effect" can be exerted, the rate of magnetoresistance change can be further improved. The spin filter effect is reduced if the crystal orientation of the back layer becomes disordered. When the layer underlying the back layer has irregularities and waviness and the back layer itself has irregularities and unevenness, the spin filter effect is reduced. Therefore, by forming the back layer using at least one metal selected from the group consisting of Ru, Pt, Ir, Rh, Pd, Os, and Cr, matching with the underlying layer is improved, and the probability that a satisfactory crystal orientation is obtained is increased, and thus the spin filter effect of the back layer for selecting the spin-up conduction electrons is easily exhibited, resulting in a high rate of resistance change.

In the spin-valve thin-film magnetic element of the present invention, preferably, at least the back layer, the free magnetic layer, the nonmagnetic conductive layer, the pinned magnetic layer, and the antiferromagnetic layer are deposited in that order on the substrate. The magnetization direction of the pinned magnetic layer is pinned by an exchange coupling magnetic field with the antiferromagnetic layer, and the magnetization direction of the free magnetic layer is aligned in a direction perpendicular to the magnetization direction of the pinned magnetic layer.

In the top-type spin-valve thin-film magnetic element, in which the back layer, the free magnetic layer, the nonmagnetic conductive layer, and the pinned magnetic layer are deposited on the substrate, and the antiferromagnetic layer is disposed thereon, if the crystal orientation of the back layer is improved and irregularities are decreased, the irregularities of other layers formed on the back layer are decreased and unevenness is also overcome, so, the spin filter effect is easily obtained and the rate of resistance change is greatly improved.

In the spin-valve thin-film magnetic element of the present invention, preferably, at least the antiferromagnetic layer, the pinned magnetic layer, the nonmagnetic conductive layer, the free magnetic layer, and the back layer are deposited in that order on the substrate. The magnetization direction of the pinned magnetic layer is pinned by an exchange coupling magnetic field with the antiferromagnetic layer, and the magnetization direction of the free magnetic layer is aligned in a direction perpendicular to the magnetization direction of the pinned magnetic layer. In the bottom-type spin-valve thin-film magnetic element in which the antiferromagnetic layer is disposed closer to the substrate, it is also possible to obtain the spin filter effect by the back layer.

In the spin-valve thin-film magnetic element of the present invention, preferably, the back layer is deposited on the substrate with an underlying layer composed of Ta therebetween.

Since the back layer formed on the Ta underlying layer is composed of the material described above, a satisfactory crystal orientation of the back layer can be easily obtained, and it is possible to easily obtain a back layer in which irregularities are decreased and the surface roughness is decreased. Since irregularities and defects are not easily caused, and the interface between the back layer and the free magnetic layer has a satisfactory joining state, a satisfactory spin filter effect is thus exhibited.

Preferably, a protective layer is deposited on the free magnetic layer on the side opposite from the substrate, the protective layer being composed of at least one metal selected from the group consisting of Ru, Pt, Ir, Rh, Pd, Os, and Cr.

When the metal or the alloy described above is formed directly on the free magnetic layer, unlike the conventional protective layer composed of Ta, thermal diffusion does not easily occur, and thus a decrease in the magnetic thickness of the free magnetic layer can be prevented, an increase in the dispersion of magnetic anisotropy at the interface between the free magnetic layer and the protective layer can be prevented, an increase in the coercive force of the free magnetic layer can be inhibited, and a decrease in the rate of resistance change can be inhibited.

Preferably, the free magnetic layer is composed of NiFe, and the protective layer has a thermal-diffusion-inhibiting function.

When the free magnetic layer is composed of NiFe, thermal diffusion may easily occur depending on the material of the protective layer, and in particular, when the protective layer is composed of Ta, thermal diffusion is increased, and thus diffusion of elements at the interface easily affects the thin-film magnetic element if heated. By using the protective layer composed of the metal or the alloy described above having the thermal-diffusion-inhibiting function, thermal diffusion does not easily occur, a decrease in the magnetic thickness of the free magnetic layer can be prevented, an increase in the dispersion of magnetic anisotropy at the interface between the free magnetic layer and the protective layer can be prevented, an increase in the coercive force of the free magnetic layer can be inhibited, and a decrease in the rate of resistance change can be inhibited.

Preferably, the spin-valve thin-film magnetic element of the present invention further includes bias layers for aligning the magnetization direction of the free magnetic layer in the direction perpendicular to the magnetization direction of the pinned magnetic layer, the bias layers being formed on both sides of a laminate including at least the antiferromagnetic layer, the pinned magnetic layer, the nonmagnetic conductive layer, the free magnetic layer, and the back layer; and electrode layers for applying a sensing current to the laminate, the electrode layers being formed on the bias layers.

By providing the bias layers, a bias can be applied to the free magnetic layer so that the magnetization direction of the free magnetic layer can be uniformly aligned, and when the magnetization direction of the free magnetic layer is varied, the magnetization direction of the entire free magnetic layer can be changed uniformly. By providing the electrode layers, a sensing current can be applied to the thin-film magnetic element.

Preferably, the pinned magnetic layer includes a nonmagnetic intermediate sub-layer, and first and second pinned magnetic sub-layers sandwiching the nonmagnetic intermediate sub-layer, the magnetization direction of the first pinned magnetic sub-layer is antiparallel to that of the second pinned magnetic sub-layer, and the first and second pinned magnetic sub-layers are in a ferrimagnetic state.

By employing a structure in which the pinned magnetic layer includes two pinned magnetic sub-layers and by setting the magnetization directions of the two pinned magnetic sub-layers to be in a ferrimagnetic state, it is possible to balance the magnetization directions in the pinned magnetic layer, and the magnetization direction of the pinned magnetic layer can be stably maintained, and thus it is possible to obtain a thin-film magnetic element having stable output characteristics.

In the spin-valve thin-film magnetic element, a structure in which the pinned magnetic layer is divided into two sub-layers may be referred to as a so-called "synthetic-ferri-pinned type", and by using such a structure, the demagnetizing field (dipole magnetic field) due to the pinned magnetization of the pinned magnetic layer is cancelled by the magnetostatic coupling magnetic field of the first pinned magnetic sub-layer and the magnetostatic coupling magnetic field of the second pinned magnetic sub-layer. Thereby, it is possible to reduce the influence of the demagnetizing field (dipole magnetic field) due to the pinned magnetization of the pinned magnetic layer on the variable magnetization direction of the free magnetic layer.

When the pinned magnetic layer is separated by the nonmagnetic intermediate sub-layer in the spin-valve thin-film magnetic element as described above, one of the pinned magnetic sub-layers fixes the other pinned magnetic sub-layer in a proper direction, and thus the pinned magnetic layer can be maintained in a very stable state.

The divided pinned magnetic layer reduces the influence of the demagnetizing field (dipole magnetic field) due to the pinned magnetization of the pinned magnetic layer on the free magnetic layer, and the variable magnetization direction of the free magnetic layer can be more easily corrected to a desired direction, and it is possible to produce a superior spin-valve thin-film magnetic element with little asymmetry, thus facilitating the control of the variable magnetization direction of the free magnetic layer.

Herein, asymmetry is defined as the degree of asymmetry of a regenerated output waveform, and if the waveform is symmetrical, the asymmetry is decreased. Therefore, as the asymmetry is brought closer to zero, the regenerated output waveform has a more superior symmetry.

The asymmetry is zero when the direction of the variable magnetization of the free magnetic layer and the direction of the pinned magnetization of the pinned magnetic layer are orthogonal to each other. When the asymmetry is greatly increased, it is not possible to read the data accurately from the media, resulting in an error. Therefore, as the asymmetry is brought closer to zero, the reliability of processing regenerated signals is improved, resulting in a superior spin-valve thin-film magnetic element.

In general, the demagnetizing field (dipole magnetic field) $H_d$ has a nonuniform distribution in which the values are large at the ends and small in the center in the element height direction, and in some cases, the free magnetic layer may be prevented from being aligned in a single-domain state. However, by using the pinned magnetic layer including the sub-layers as described above, the dipole magnetic field $H_d$ can be set to be substantially zero, and thus the free magnetic layer is not prevented from being aligned in a single-domain state due to the formation of domain walls, resulting in nonuniform magnetization, and thus it is possible to prevent Barkhausen noise, etc. from occurring, which may result in instability in which signals from the magnetic recording medium are inaccurately processed in the spin-valve thin-film magnetic element.

Preferably, in the present invention, the free magnetic layer includes a nonmagnetic intermediate sub-layer, and first and second free magnetic sub-layers sandwiching the nonmagnetic intermediate sub-layer, the magnetization direction of the first free magnetic sub-layer is antiparallel to that of the second free magnetic sub-layer, and the first and second free magnetic sub-layers are in a ferrimagnetic state.

By using a structure in which the free magnetic layer includes two free magnetic sub-layers and by setting the magnetization directions of the two free magnetic sub-layers to be in a ferrimagnetic state, it is possible to balance the magnetization directions in the free magnetic layer, and the magnetization direction of the free magnetic layer can be stably maintained, and thus it is possible to obtain a thin-film magnetic element having stable output characteristics.

Preferably, the antiferromagnetic layer is composed of one of an X—Mn alloy and a Pt—Mn—X' alloy, where X is an element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

Since the antiferromagnetic layer composed of such an alloy has a high blocking temperature at which the exchange coupling magnetic field disappears, the antiferromagnetic layer is thermally stable, and since a high exchange coupling magnetic field for pinning the magnetization of the pinned magnetic layer is obtained, the ability of pinning the pinned magnetic layer can be increased.

More preferably, the antiferromagnetic layer is composed of an X—Mn alloy, where X is an element selected from the group consisting of Pt, Pd, Ir, Rh, Ru, and Os, and the X content is in the range from 37 to 63 atomic %. Alternatively, more preferably, the antiferromagnetic layer is composed of an X'—Pt—Mn alloy, where X' is at least one element selected from the group consisting of Pd, Cr, Ru, Ni, Ir, Rh, Os, Au, Ag, Ne, Ar, Xe, and Kr, and the X'+Pt content is in the range from 37 to 63 atomic %.

By using the X—Mn alloy or the X'—Pt—Mn alloy as the antiferromagnetic layer, in comparison with an NiO alloy, an FeMn alloy, and an NiMn alloy which have been conventionally used as the antiferromagnetic layer, it is possible to obtain a spin-valve thin-film magnetic element having superior characteristics, for example, a larger exchange coupling magnetic field, a higher blocking temperature, and a higher corrosion resistance.

Preferably, a Co layer is disposed on at least one of the free magnetic layer side of the nonmagnetic conductive layer and the pinned magnetic layer side of the nonmagnetic conductive layer.

In the spin-valve structure in which the nonmagnetic conductive layer is interposed between the free magnetic layer and the pinned magnetic layer, by disposing the Co layer on both sides or one side of the nonmagnetic conductive layer, a larger change in resistance can be easily obtained.

DESCRIPTION OF THE PREFERRED EMBODIMENTS

First Embodiment

Figure 1:
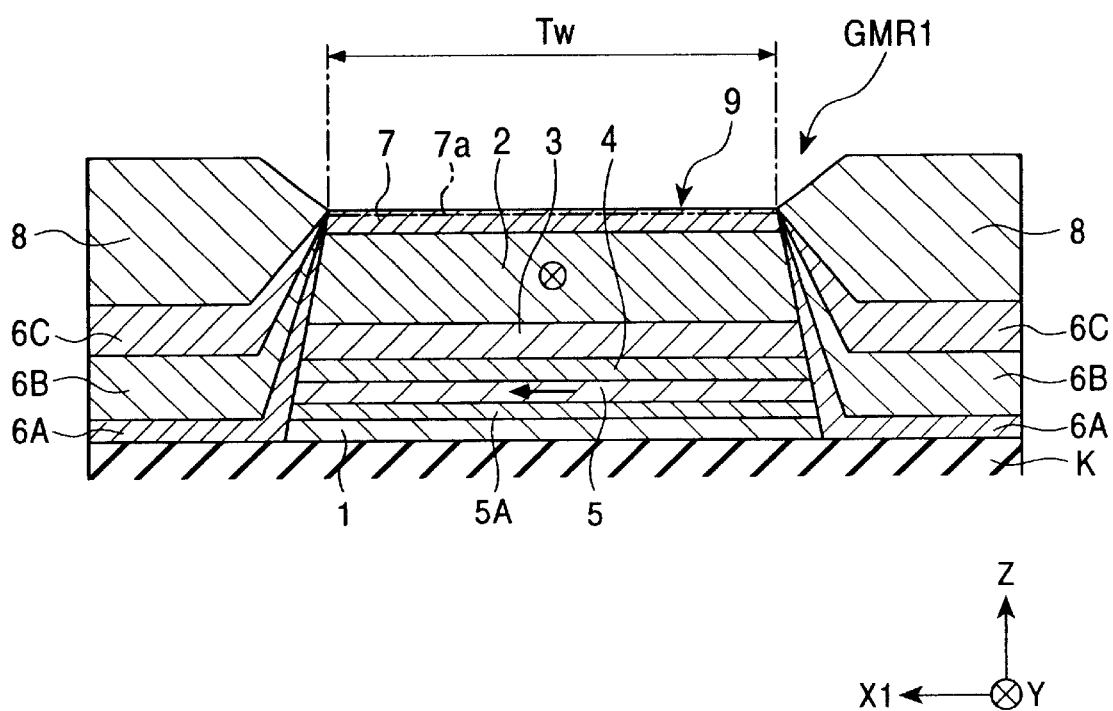
FIG. 1 is a sectional view of a spin-valve thin-film magnetic element in a first embodiment of the present invention, viewed from a surface facing a recording medium.

FIG. 1 is a sectional view of a spin-valve thin-film magnetic head in a first embodiment of the present invention, viewed from a surface (ABS) facing a recording medium.

The spin-valve thin-film magnetic element in the present invention is a giant magnetoresistive element using a giant magnetoresistance effect. A spin-valve thin-film magnetic element GMR1 in the first embodiment is provided on a trailing edge of a floating-type slider in a hard disk drive, etc., and detects a recorded magnetic field from a hard disk, etc., as will be described below. A magnetic recording medium, such as a hard disk, travels in the Z direction in the drawing, and a fringing magnetic field from the magnetic recording medium is directed in the Y direction.

The spin-valve thin-film magnetic element GMR1 is a "top-type" single spin-valve thin-film element in which a free magnetic layer, a nonmagnetic conductive layer, a pinned magnetic layer, and an antiferromagnetic layer are formed in that order on a substrate.

As shown in FIG. 1, an underlying layer 1 is provided on a substrate K. A back layer 5A, a free magnetic layer 5, a nonmagnetic conductive layer 4, a pinned magnetic layer 3, an antiferromagnetic layer 2, and a protective layer 7 are deposited in that order on the underlying layer 1. The underlying layer 1, the back layer 5A, the free magnetic layer 5, the nonmagnetic conductive layer 4, the pinned magnetic layer 3, the antiferromagnetic layer 2, and the protective layer 7 constitute a laminate 9, which has a trapezoidal cross-section.

On both sides in the width direction (track width Tw direction) of the laminate 9, bias underlying layers 6A, hard bias layers 6B, intermediate layers 6C, and electrode layers 8 are deposited. The hard bias layers 6B are magnetized in the X1 direction in FIG. 1, and thereby the magnetization direction of the free magnetic layer 5 is aligned in the X1 direction.

Preferably, the antiferromagnetic layer 2 has a thickness of approximately 50 to 300 Å in the center of the laminate 9, and is composed of a PtMn alloy. The PtMn alloy has a superior corrosion resistance, a higher blocking temperature, and a larger exchange coupling magnetic field (exchange anisotropic magnetic field) in comparison with an NiMn alloy or an FeMn alloy which has been conventionally used as the antiferromagnetic layer.

The antiferromagnetic layer 2 may be composed of an X—Mn alloy, where X is an element selected from the group consisting of Pd, Ir, Rh, Ru, and Os, or an X'—Pt—Mn alloy, where X' is at least one element selected from the group consisting of Pd, Cr, Ru, Ni, Ir, Rh, Os, Au, Ag, Ne, Ar, Xe, and Kr, instead of the PtMn alloy.

In the PtMn alloy and the X—Mn alloy, the Pt content or the X content is preferably in the range from 37 to 63 atomic %, and more preferably, 47 to 57 atomic %.

In the X'—Pt—Mn alloy, the X'+Pt content is preferably in the range from 37 to 63 atomic %, and more preferably, 47 to 57 atomic %. Furthermore, in the X'—Pt—Mn alloy, the X' content is preferably in the range from 0.2 to 10 atomic %.

However, when X' is at least one element selected from the group consisting of Pd, Ru, Ir, Rh, and Os, the X' content is preferably in the range from 0.2 to 40 atomic %.

By using an alloy having the appropriate composition described above as the antiferromagnetic layer 2 and by carrying out an annealing treatment, an antiferromagnetic layer 2 having a large exchange coupling magnetic field can be obtained. In particular, if the PtMn alloy is used, it is possible to obtain a superior antiferromagnetic layer 2 having an exchange coupling magnetic field of 48 kA/m or more, for example, more than 64 kA/m, and a blocking temperature as high as 380° C.

Although these alloys, as deposited, have disordered face-centered cubic structures (fcc, in which the a-axis and c-axis have the same lattice constant), the structures are transformed into CuAuI-type ordered face-centered tetragonal structures (fct: a-axis/c-axis≈0.9) by annealing.

The pinned magnetic layer 3 is a ferromagnetic thin film, for example, composed of Co, an NiFe alloy, a CoNiFe alloy, a CoFe alloy, or a CoNi alloy, and preferably has a thickness of approximately 10 to 50 Å. For example, the pinned magnetic layer 3 is composed of Co and the thickness thereof is set at 30 Å.

The pinned magnetic layer 3 is formed in contact with the antiferromagnetic layer 2, and by performing magnetic annealing (heat treatment), an exchange coupling magnetic field (exchange anisotropic magnetic field) is produced at the interface between the pinned magnetic layer 3 and the antiferromagnetic layer 2. For example, as shown in FIG. 1, the magnetization of the pinned magnetic layer 3 is pinned in the Y direction.

As the exchange coupling magnetic field intensity is increased, the magnetization of the pinned magnetic layer 3 can be maintained more stably, and in particular, by using the alloy having the composition described above, such as the PtMn alloy, which has a high blocking temperature and which produces a large exchange coupling magnetic field (exchange anisotropic magnetic field) at the interface with the pinned magnetic layer 3, as the antiferromagnetic layer 2, it is also possible to maintain the thermal stability of the magnetization state of the pinned magnetic layer 3.

The free magnetic layer 5 is composed of a CoFe alloy, an FeNi alloy, or the like, and preferably, has a thickness of 10 to 50 Å, and more preferably, 15 to 30 Å.

If the thickness of the free magnetic layer 5 exceeds 50 Å, a shunt loss occurs in the sensing current, and if the thickness is less than 10 Å, a difference in the mean free path between the spin-up conduction electrons and the spin-down conduction electrons being transported through the free magnetic layer is decreased. Consequently, the rate of resistance change $\Delta R/R$ in the GMR effect is decreased, and regenerated output characteristics of the spin-valve thin-film element may be degraded.

In this embodiment, the free magnetic layer 5 may be a single layer composed of CoFe. Furthermore, the free magnetic layer 5 may be set to have a Co-rich composition, for example, the ratio Co:Fe may be set at 90:10 in atomic %. When the free magnetic layer 5 has such a Co-rich composition, the rate of resistance change ($\Delta R/R$) is expected to increase, which is desirable.

The back layer 5A is composed of at least one metal selected from the group consisting of Ru, Pt, Ir, Rh, Pd, Os, and Cr. When the back layer 5A has a single layer, preferably, one elemental metal selected from the above or an alloy of at least two elemental metals selected from the above is used for the back layer 5A. When the back layer 5A has a layered structure including a plurality of layers, preferably, the layered structure includes elemental metal layers, includes alloy layers, or includes an elemental metal layer and an alloy layer. The back layer 5A preferably has a thickness of 10 to 30 Å, and more preferably, 12 to 20 Å.

The substrate K is composed of a ceramic material constituting a slider of a thin-film magnetic head, which will be described below, in which an insulating layer or a planarizing layer is provided on the entire surface thereof as necessary.

The underlying layer 1 is composed of Ta or the like, and may be composed of a metal selected from the group consisting of Ru, Pt, Ir, Rh, Pd, Os, and Cr, or an alloy thereof.

The nonmagnetic conductive layer 4 is composed of Cu or the like, and the thickness thereof is set, for example, at 20 to 30 Å.

The protective layer 7 is composed of Ta or the like, and the surface thereof is oxidized to form an oxidized layer 7a.

The bias underlying layer 6A acts as a buffer layer and as an alignment layer, and is preferably composed of Cr or the like. The bias underlying layer 6A has a thickness of, for example, approximately 20 to 50 Å, and preferably, approximately 35 Å. The intermediate layer 6C is, for example, composed of Ta, and has a thickness of approximately 50 Å.

The bias underlying layer 6A and the intermediate layer 6C function as diffusion barriers when exposed to high temperatures in the insulating resist-hardening step (UV cure or hard bake) carried out in the subsequent fabrication process of an inductive head (write head), and thermal diffusion occurs between the hard bias layers 6B and the peripheral layers, and thus the degradation of magnetic properties of the hard bias layers 6B can be prevented.

The hard bias layers 6B usually have a thickness of approximately 200 to 500 Å, and are preferably composed of a Co—Pt alloy, a Co—Cr—Pt alloy, a Co—Cr—Ta alloy, or the like.

Since the hard bias layers 6B are magnetized in the X1 direction in the drawing, the magnetization of the free magnetic layer 5 is aligned in the X1 direction. Consequently, the variable magnetization of the free magnetic layer 5 and the pinned magnetization of the pinned magnetic layer 3 are perpendicular to each other.

The electrode layers 8 are a single layer or are multilayered composed of at least one material selected from the group consisting of Cr, Au, Ta, and W, and preferably, the resistance is decreased as much as possible. In this embodiment, Cr is selected as the material for the electrode layers 8, and by epitaxially growing Cr on the intermediate layer 6C composed of Ta, the resistance is decreased.

In the spin-valve thin-film magnetic element shown in FIG. 1, a sensing current is applied to the laminate 9 from the electrode layers 8. When a magnetic field from a magnetic recording medium is applied in the Y direction, the magnetization of the free magnetic layer 5 is changed from the X1 direction to the Y direction. At this stage, a spin-dependent conduction electron scattering occurs due to the so-called "GMR effect" at the interface between the nonmagnetic conductive layer 4 and the free magnetic layer 5, and electrical resistance changes, and thus a fringing magnetic field from the recording medium is detected.

The mean free path of the spin-up electrons, which contribute to the magnetoresistance effect, is extended by the back layer 5A, and a large rate of resistance change ($\Delta R/R$) is obtained in the spin-valve thin-film element due to the so-called spin filter effect, thus enabling the spin-valve thin-film element to be suitable for high-density recording.

The spin filter effect will be described below.

Figure 2B:
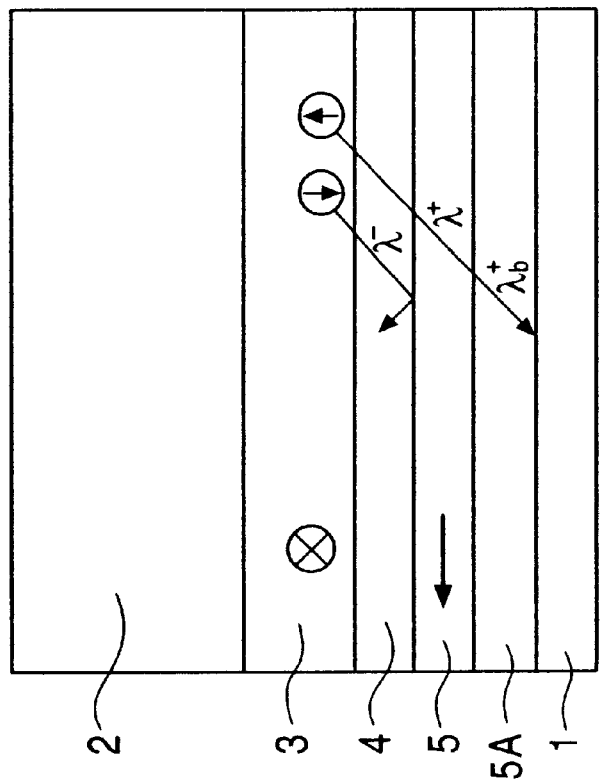
FIGS. 2A and 2B are schematic diagrams illustrating the spin filter effect of a back layer in a spin-valve thin-film magnetic element of the present invention, in which the back layer is not provided in the element shown in FIG. 2A, and the back layer is provided in the element shown in FIG. 2B.
Figure 2A:
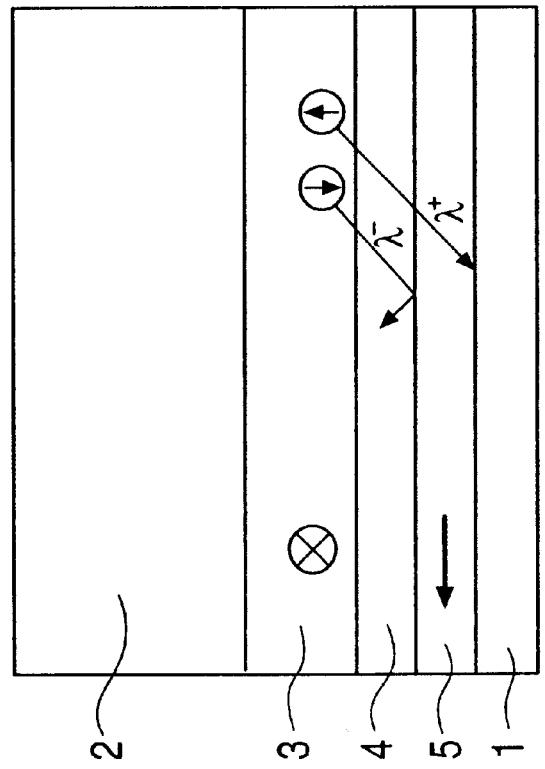

FIGS. 2A and 2B are schematic diagrams illustrating the spin filter effect due to a back layer in a spin-valve thin-film magnetic element.

The giant magnetoresistance (GMR) effect observed in the magnetic material is mainly caused by "spin-dependent scattering" of electrons. That is, the GMR effect is obtained using the difference between the mean free path ($\lambda^+$) of the conduction electrons having a spin parallel to the magnetization direction of the magnetic material (spin-up electrons), namely, the free magnetic layer 5, and the mean free path ($\lambda^-$) of the conduction electrons having a spin antiparallel to the magnetization direction of the magnetic material (spin-down electrons). In FIGS. 2A and 2B, upward arrows represent the spin-up conduction electrons, and downward arrows represent the spin-down conduction electrons.

When an electron enters the free magnetic layer 5, if the electron has a spin parallel to the magnetization direction of the free magnetic layer 5, the electron can freely move. In contrast, if the electron has a spin antiparallel to the magnetization direction of the free magnetic layer 5, the electron is immediately scattered.

The reason for this is that the mean free path ($\lambda^+$) of the spin-up electrons is, for example, approximately 50 Å, while the mean free path ($\lambda^-$) of the spin-down electrons is approximately 6 Å, which is extremely shorter than that of the spin-up electrons, almost one tenth.

In this embodiment, the thickness of the free magnetic layer 5 is set larger than the mean free path ($\lambda^-$) of the spin-down electrons, which is approximately 6 Å, and is set smaller than the mean free path ($\lambda^+$) of the spin-up electrons, which is approximately 50 Å.

Therefore, when entering the free magnetic layer 5, the spin-down conduction electrons (minority carriers) are effectively blocked by the free magnetic layer 5, namely, are filtered out, while the spin-up conduction electrons (majority carriers) essentially pass through the free magnetic layer 5.

Majority carriers and minority carriers originating in the pinned magnetic layer 3, namely, spin-up electrons and spin-down electrons, move toward the free magnetic layer 5 and function as carriers for charge transfer.

When the magnetization of the free magnetic layer 5 is rotated, the majority carriers and the minority carriers are scattered in a different state. That is, since the majority carriers and the minority carriers pass through the free magnetic layer 5 differently, the GMR effect is brought about.

Although electrons which are transported from the free magnetic layer 5 to the pinned magnetic layer 3 also contribute to the GMR effect, since electrons moving from the pinned magnetic layer 3 to the free magnetic layer 5 and electrons moving from the free magnetic layer 5 to the pinned magnetic layer 3 move in the same direction if averaged, the description thereof will be omitted. With respect to electrons originating in the nonmagnetic conductive layer 4, since the number of spin-up electrons is equal to the number of spin-down electrons, the sum of the mean free paths do not change, and the description thereof will also be omitted.

The number of minority carriers, namely, spin-down electrons, originating in the pinned magnetic layer 3 and passing through the nonmagnetic conductive layer 4, is equal to the number of spin-down electrons scattered at the interface between the pinned magnetic layer 3 and the nonmagnetic conductive layer 4. The spin-down electrons are scattered in the vicinity of the interface between the nonmagnetic conductive layer 4 and the pinned magnetic layer 3 before reaching the interface with the free magnetic layer 5. That is, even if the magnetization direction of the free magnetic layer 5 is rotated, the mean free path of the spin-down electrons is not changed and remains very short in comparison with the mean free path of the spin-up electrons, and thus the spin-down electrons do not affect the change in resistance which contributes to the GMR effect.

Therefore, with respect to the GMR effect, only the behavior of the spin-up electrons may be taken into consideration.

The majority carriers, namely, spin-up electrons, originating in the pinned magnetic layer 3, pass through the nonmagnetic conductive layer 4 having a thickness that is shorter than the mean free path ($\lambda^+$) of the spin-up electrons, and reach the free magnetic layer 5.

When an external magnetic field is not applied to the free magnetic layer 4 and the magnetization direction of the free magnetic layer 5 is not rotated, since the spin-up electrons have spin parallel to the magnetization direction of the free magnetic layer 5, the spin-up electrons pass through the free magnetic layer 5 freely.

As shown in FIG. 2B, the spin-up electrons which have passed through the free magnetic layer 5 are transmitted through the back layer 5A by an additional mean free path $\lambda^+_b$ determined by the material of the back layer 5A, and then are scattered. In the structure shown in FIG. 2A in which the back layer 5A is not provided, spin-up electrons are transmitted through the free magnetic layer 5 and are scattered at the surface thereof. As compared with this, in the structure shown in FIG. 2B in which the back layer 5A is provided, the mean free path is extended by the additional mean free path $\lambda^+_b$ length.

Accordingly, among conductive materials having relatively low resistances (namely, long mean free paths), by using at least one metal selected from the group consisting of Ru, Pt, Ir, Rh, Pd, Os, and Cr as the back layer 5A, the resistance of the spin-valve thin-film element is decreased.

When the magnetization direction of the free magnetic layer 5 is rotated by applying an external magnetic field, since the magnetization of the free magnetic layer 5 and the spin orientation are different, the spin-up electrons are scattered in the free magnetic layer 5, and the effective mean free path is suddenly decreased. That is, the resistance is increased.

Therefore, in the structure shown in FIG. 2B, the GMR effect in which the rate of resistance change ($\Delta R/R$) is larger than that of the structure shown in FIG. 2A can be observed, and thus the regenerated output characteristics of the spin-valve thin-film element is improved.

The back layer 5A is formed on the underlying layer 1 composed of Ta. If a back layer composed of Cu is formed on the Ta underlying layer 1, the Cu back layer has a lattice which unsatisfactorily matches the Ta underlying layer 1. In the case of the Cu back layer with a thickness of several ten angstroms, the crystal orientation becomes insufficient, and it is not possible to obtain a sufficiently large rate of resistance change using the spin filter effect.

In contrast, if the back layer 5A is composed of at least one metal selected from the group consisting of Ru, Pt, Ir, Rh, Pd, Os, and Cr, the back layer 5A is deposited on the Ta underlying layer 1 with a satisfactory crystal orientation because of the good lattice match with the Ta underlying layer 1. Since the back layer 5A is formed with a satisfactory crystal orientation, it is possible to decrease the irregularities of the back layer 5A and to decrease the surface roughness, and thereby the free magnetic layer 5, the nonmagnetic conductive layer 4, and the antiferromagnetic layer 3 are deposited with uniform thicknesses on the back layer 5A. Consequently, the rate of resistance change ($\Delta R/R$) is improved and the coercive force of the free magnetic layer 5 is reduced, and thus the magnetization of the free magnetic layer 5 is rotated with a high sensitivity in response to an external magnetic field.

In the spin-valve thin-film magnetic element in this embodiment, by setting the thickness of the free magnetic layer 5 preferably in the range from 10 to 50 Å, and more preferably, from 15 to 30 Å, a shunt loss in the sensing current, which occurs when the thickness is larger than the above range, can be prevented, and also it is possible to prevent a decrease in the difference between the mean free path of the spin-up conduction electrons passing through the free magnetic layer and the mean free path of the spin-down conduction electrons, which occurs when the thickness is smaller than the above range. Thereby, it is possible to prevent a decrease in the rate of resistance change ($\Delta R/R$) of the GMR effect, and also it is possible to prevent degradation in regenerated output characteristics of the spin-valve thin-film magnetic element.

Figure 3:
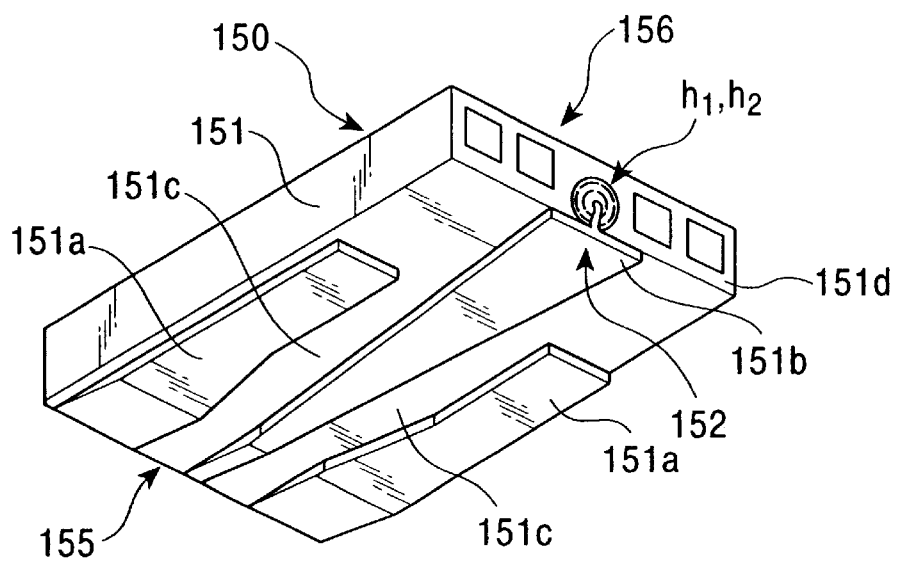
FIG. 3 is a perspective view of a thin-film magnetic head provided with the spin-valve thin-film magnetic element in the first embodiment of the present invention.
Figure 4:
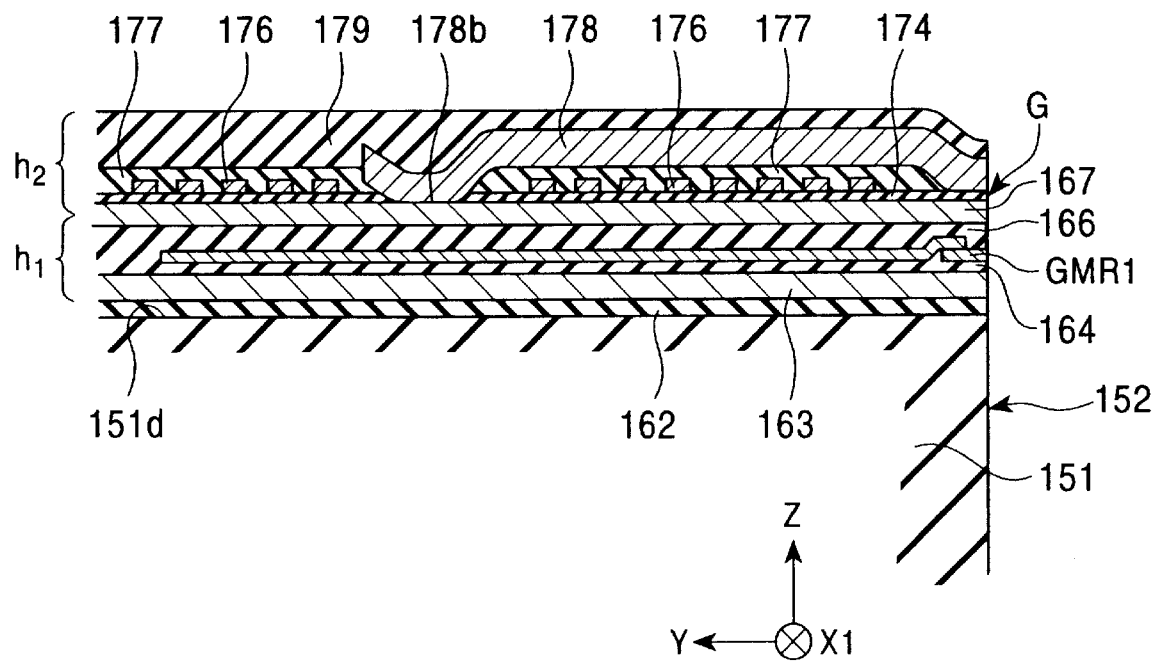
FIG. 4 is an enlarged sectional view of a magnetic core section of the thin-film magnetic head shown in FIG. 3.

FIGS. 3 and 4 show a floating-type magnetic head 150 provided with a thin-film magnetic head including the spin-valve thin-film magnetic element GMR1.

The floating-type magnetic head 150 shown in FIG. 3 includes a slider 151, and a thin-film magnetic head $h_1$ and an inductive head $h_2$ which are provided on an end 151d of the slider 151. In the slider 151, numeral 155 represents the leading side and numeral 156 represents the trailing side. On a surface (ABS) 152 facing a recording medium, rails 151a and 151b are formed, and air grooves 151c are formed between the individual rails.

As shown in FIGS. 3 and 4, the thin-film magnetic head $h_1$ includes an insulating layer 162 formed on the end 151d of the slider 151, a lower shielding layer 163 deposited on the insulating layer 162, a lower gap layer 164 deposited on the lower shielding layer 163, the spin-valve thin-film magnetic element GMR1 of the present invention formed on the lower gap layer 164 and exposed to the surface 152 facing the recording medium, an upper gap layer 166 covering the spin-valve thin-film magnetic element GMR1, and an upper shielding layer 167 covering the upper gap layer 166. The upper shielding layer 167 also acts as a lower core layer of the inductive head $h_2$ which will be described below. The slider 151, the insulating layer 162, the lower shielding layer 163, and the lower gap layer 164 correspond to the substrate K shown in FIG. 1.

The inductive head $h_2$ includes the lower core layer (upper shielding layer) 167, a gap layer 174 deposited on the lower core layer 167, a coil 176, an upper insulating layer 177 covering the coil 176, and an upper core layer 178 joined with the gap layer 174 and also joined with the lower core layer 167 at the coil 176 side. The coil 176 is spirally patterned on the gap layer 174, and a base 178b of the upper core layer 178 is magnetically coupled to the lower core layer 167 substantially in the center of the coil 176.

A core protective layer 179 composed of alumina or the like is deposited on the upper core layer 178.

When the slider 151 shown in FIGS. 3 and 4 travels while floating relative to the magnetic recording medium and an electric current is applied to the coil 176 using the inductive head $h_2$, by applying fringing flux from the magnetic gap G on the tip of the gap layer 174 to the magnetic recording medium, magnetic recording is performed, and also by detecting a fringing magnetic field from the magnetic recording medium using the spin-valve thin-film magnetic element GMR1, magnetic information is read with a high sensitivity.

Second Embodiment

Next, a spin-valve thin-film magnetic element in a second embodiment of the present invention will be described.

Figure 5:
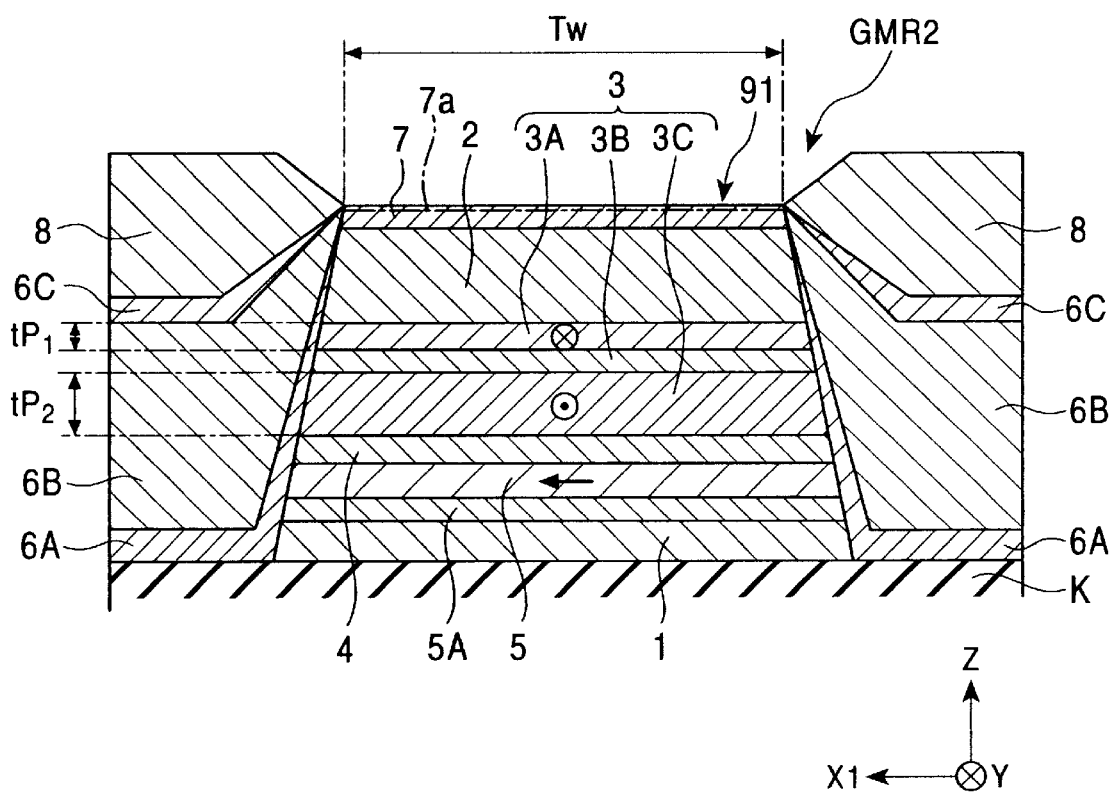
FIG. 5 is a sectional view of a spin-valve thin-film magnetic element in a second embodiment of the present invention, viewed from a surface facing a recording medium.

FIG. 5 is a sectional view of a spin-valve thin-film magnetic element GMR2 in the second embodiment, viewed from a surface (ABS) facing recording medium.

The spin-valve thin-film magnetic element GMR2 in this embodiment is a top-type single spin-valve thin-film element, which is substantially the same as the spin-valve thin-film magnetic element GMR1 in the first embodiment shown in FIG. 1, and the same reference numerals are used for the corresponding parts.

The spin-valve thin-film magnetic element GMR2 in this embodiment differs from the first embodiment in that a pinned magnetic layer includes a first pinned magnetic layer and a second pinned magnetic layer formed on the first pinned magnetic layer with a nonmagnetic intermediate layer therebetween, the magnetization direction of the second pinned magnetic layer being aligned antiparallel to the magnetization direction of the first pinned magnetic layer, and thus the pinned magnetic layer is in a synthetic ferrimagnetic state, namely, the pinned magnetic layer has a so-called "synthetic-ferri-pinned type structure".

In this embodiment, a first pinned magnetic layer 3A and a second pinned magnetic layer 3C are formed on a nonmagnetic conductive layer 4 composed of Cu or the like.

A pinned magnetic layer 3 includes the second pinned magnetic layer 3C deposited on the nonmagnetic conductive layer 4, and the first pinned magnetic layer 3A formed on the second pinned magnetic layer 3C with a nonmagnetic intermediate layer 3B therebetween, the magnetization direction of the first pinned magnetic layer 3A being aligned antiparallel to the magnetization direction of the second pinned magnetic layer 3C.

An antiferromagnetic layer 2 composed of a PtMn alloy or the like is formed on the first pinned magnetic layer 3A.

The first and second pinned magnetic layers 3A and 3C are ferromagnetic thin films, for example, composed of Co, an NiFe alloy, a CoNiFe alloy, a CoFe alloy, or a CoNi alloy, and preferably, have a thickness of approximately 40 Å. For example, the first pinned magnetic layer 3A is composed of Co and has a thickness of 13 to 15 Å, and the second pinned magnetic layer 3C is composed of Co and has a thickness of 20 to 25 Å.

The nonmagnetic intermediate layer 3B is composed of at least one metal selected from the group consisting of Ru, Rh, Ir, Cr, Re and Cu, and usually has a thickness of approximately 8 Å.

The first pinned magnetic layer 3A is formed in contact with the antiferromagnetic layer 2, and by performing magnetic annealing (heat treatment), an exchange coupling magnetic field (exchange anisotropic magnetic field) is produced at the interface between the first pinned magnetic layer 3A and the antiferromagnetic layer 2, and for example, as shown in FIG. 5, the magnetization of the first pinned magnetic layer 3A is pinned in the Y direction. If the magnetization of the first pinned magnetic layer 3A is pinned in the Y direction, the magnetization of the second pinned magnetic layer 3C, which is opposed to the first pinned magnetic layer 3A with the nonmagnetic intermediate layer 3B therebetween, is pinned antiparallel to the magnetization direction of the first pinned magnetic layer 3A, namely, is pinned in a direction opposite to the Y direction.

As shown in FIG. 5, the individual layers from an underlying layer 1 to an oxidized layer 7a constitute a laminate 91, which has a trapezoidal cross-section.

As the exchange coupling magnetic field intensity is increased, the magnetization of the first pinned magnetic layer 3A and the magnetization of the second pinned magnetic layer 3C can be stably maintained antiparallel to each other, and in particular, by using a PtMn alloy or the like, which has a high blocking temperature and which produces a large exchange coupling magnetic field (exchange anisotropic magnetic field) at the interface with the first pinned magnetic layer 3A, as the antiferromagnetic layer 2, it is possible to maintain the thermal stability of the magnetization state of the first pinned magnetic layer 3A and the second pinned magnetic layer 3C.

In this embodiment, by setting the thickness ratio between the first pinned magnetic layer 3A and the second pinned magnetic layer 3C within an appropriate range, the exchange coupling magnetic field (Hex) can be increased, the magnetization of the first pinned magnetic layer 3A and the magnetization of the second pinned magnetic layer 3C can be maintained in a thermally stable antiparallel state (ferrimagnetic state), and also it is possible to secure the rate of resistance change ($\Delta R/R$) substantially to the same degree as that of the conventional spin-valve thin-film magnetic element. Moreover, by appropriately controlling the size and the direction of the magnetic field during annealing, the magnetization directions of the first pinned magnetic layer 3A and the second pinned magnetic layer 3C can be aligned in desired directions.

The back layer 5A is composed of at least one metal selected from the group consisting of Ru, Pt, Ir, Rh, Pd, Os, and Cr. When the back layer 5A has a single layer, preferably, one elemental metal selected from the above or an alloy of at least two elemental metals selected from the above is used for the back layer 5A. When the back layer 5A has a layered structure including a plurality of layers, preferably, the layered structure includes elemental metal layers, includes alloy layers, or includes an elemental metal layer and an alloy layer. The back layer 5A preferably has a thickness of 12 to 20 Å.

The substrate K is composed of a ceramic material constituting a slider of a thin-film magnetic head, which will be described below, in which an insulating layer or a planarizing layer is provided on the entire surface thereof as necessary.

The underlying layer 1 is composed of Ta or the like, and may be composed of at least one metal selected from the group consisting of Ru, Pt, Ir, Rh, Pd, Os, and Cr.

The nonmagnetic conductive layer 4 is composed of Cu or the like, and the thickness thereof is set, for example, at 20 to 30 Å.

The protective layer 7 is composed of Ta or the like, and the surface thereof is oxidized to form the oxidized layer 7a.

In the spin-valve thin-film magnetic element in this embodiment, the first pinned magnetic layer 3A and the second pinned magnetic layer 3C formed on the first pinned magnetic layer 3A with the nonmagnetic intermediate layer 3B therebetween, the magnetization direction of the second pinned magnetic layer 3C being aligned antiparallel to the magnetization direction of the first pinned magnetic layer 3A, are included in the laminate 91, and thus a structure in which the pinned magnetic layer is in a synthetic ferrimagnetic state is produced, namely, the so-called "synthetic-ferri-pinned type" structure is produced. Therefore, the demagnetizing field (dipole magnetic field) $H_d$ produced by the first pinned magnetic layer 3A and the second pinned magnetic layer 3C can be cancelled by the magnetostatic coupling magnetic field $H_{p1}$ of the first pinned magnetic layer 3A and the magnetostatic coupling magnetic field $H_{p2}$ of the second pinned magnetic layer 3C.

Thereby, the demagnetizing field (dipole magnetic field) $H_d$, which may affect the variable magnetization direction of the free magnetic layer 4, can be set to be substantially zero, and thus it is possible to greatly reduce the influence of the demagnetizing field (dipole magnetic field) $H_d$ due to the pinned magnetization of the pinned magnetic layer on the variable magnetization $M_r$ of the free magnetic layer 4.

Consequently, the free magnetic layer 4 is not prevented from being aligned in a single-domain state due to the formation of domain walls, nonuniform magnetization can be avoided, and thus it is possible to prevent Barkhausen noise from occurring, which may result in instability in which signals from the magnetic recording medium is inaccurately processed in the spin-valve thin-film magnetic element.

In this embodiment, the direction of the variable magnetization of the free magnetic layer 4 can be more easily corrected in a desired direction, and the direction of the variable magnetization of the free magnetic layer 4 can be more easily controlled so as to produce a superior spin-valve thin-film magnetic element having little asymmetry.

Herein, asymmetry corresponds to a degree of asymmetry of a regenerated output waveform, and if the waveform is symmetrical, the asymmetry is decreased. Therefore, as the asymmetry is brought close to zero, the regenerated output waveform has much superior symmetry.

The asymmetry is zero when the direction of the variable magnetization of the free magnetic layer and the direction of the pinned magnetization of the pinned magnetic layer are orthogonal to each other. When the asymmetry is greatly increased, it is not possible to read the data accurately from the media, resulting in an error. Therefore, as the asymmetry is brought closer to zero, the reliability of processing regenerated signals is improved, resulting in a superior spin-valve thin-film magnetic element.

In the spin-valve thin-film magnetic element in the second embodiment, in the same manner as that in the first embodiment, the mean free path of the spin-up electrons, that contribute to the magnetoresistance effect, is extended by the back layer 5A, and a large rate of resistance change (ΔR/R) is obtained by the spin filter effect in the spin-valve thin-film element, thus enabling the spin-valve thin-film magnetic element to be suitable for high-density recording.

By providing the spin-valve thin-film magnetic element GMR2 in the second embodiment on the slider 150 shown in FIGS. 3 and 4, a floating-type magnetic head including a thin-film head and an inductive head is fabricated.

Third Embodiment

Next, a spin-valve thin-film magnetic element in a third embodiment of the present invention will be described.

Figure 6:
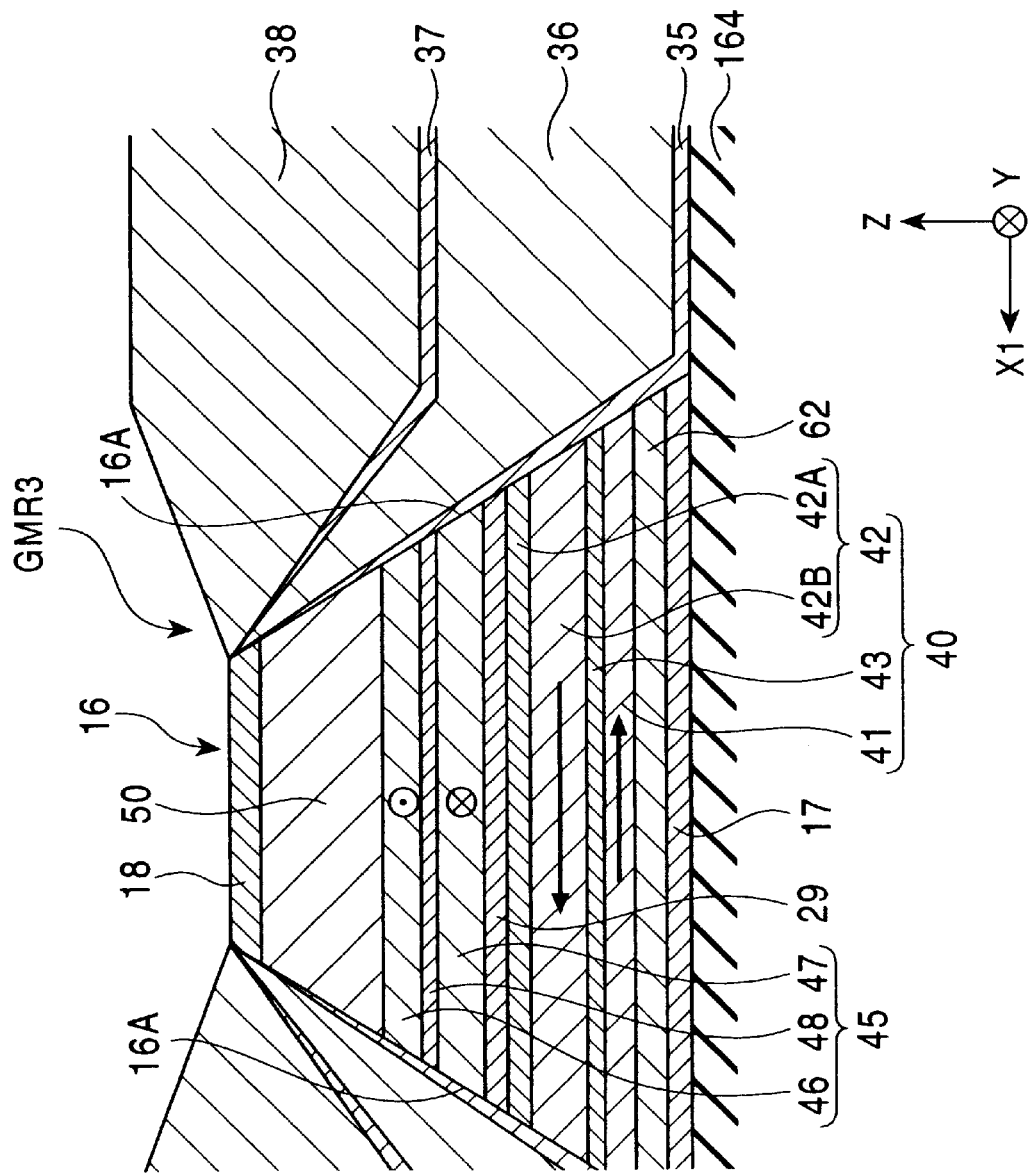
FIG. 6 is a sectional view of a spin-valve thin-film magnetic element in a third embodiment of the present invention, viewed from a surface facing a recording medium.
Figure 7:
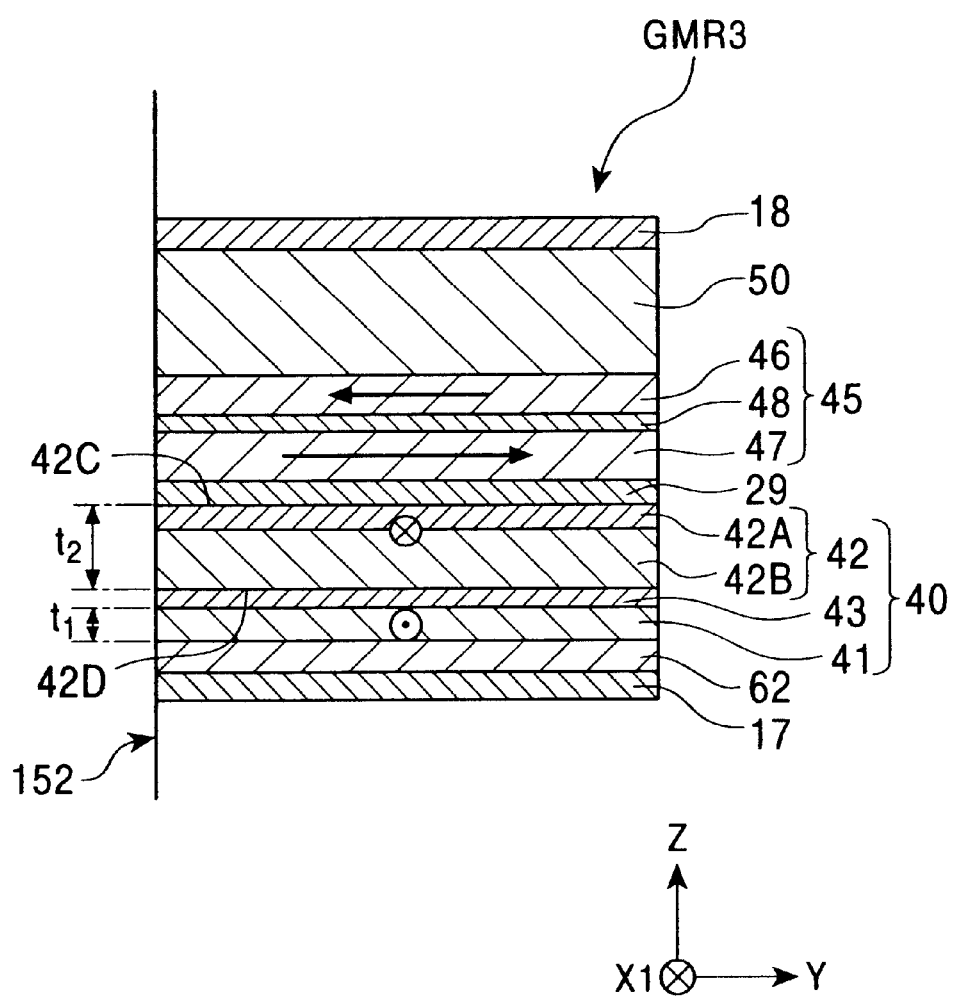
FIG. 7 is a sectional view which schematically shows a key section of the spin-valve thin-film magnetic element in the third embodiment.

FIG. 6 is a sectional view of a spin-valve thin-film magnetic element GMR3 in the third embodiment, viewed from a surface facing a magnetic recording medium, and FIG. 7 is a sectional view of the spin-valve thin-film magnetic element GMR3, taken in the track-width direction.

In FIGS. 6 and 7, the magnetic recording medium travels in the Z direction, a fringing magnetic field from the magnetic recording medium is directed in the Y direction, and the X1 direction is parallel to the track width direction of the spin-valve thin-film magnetic element GMR3.

The spin-valve thin-film magnetic element GMR3 shown in FIGS. 6 and 7 is provided on the thin-film magnetic head $h_1$ shown in FIGS. 3 and 4 to constitute a floating-type magnetic head in the same manner as that of the spin-valve thin-film magnetic element GMR1 in the first embodiment.

The spin-valve thin-film magnetic element GMR3 is a top-type single spin-valve thin-film element in which a free magnetic layer 40, a nonmagnetic conductive layer 29, a pinned magnetic layer 45, and an antiferromagnetic layer 50 are deposited in that order.

As shown in FIG. 6, an underlying layer 17 is deposited on a lower gap layer 164, a back layer 62 is deposited on the underlying layer 17, the free magnetic layer 40 is deposited on the back layer 62, the nonmagnetic conductive layer 29 is deposited on the free magnetic layer 40, the pinned magnetic layer 45 is deposited on the nonmagnetic conductive layer 29, the antiferromagnetic layer 50 is deposited on the pinned magnetic layer 45, and a protective layer (cap layer) 18 is deposited on the antiferromagnetic layer 50.

A laminate 16, which has a trapezoidal cross-section, having a width corresponding to the track width, is thus formed by depositing the individual layers from the underlying layer 17 to the protective layer 18.

Bias layers 36 are formed on both sides in the X1 direction of the laminate 16, namely, on both sides in the track width direction of the laminate 16. The bias layers 36 are formed along both sides 16A of the laminate 16 which tapers toward the protective layer 18. The bias layers 36 align the magnetization direction of the free magnetic layer 40 so that Barkhausen noise is reduced in the free magnetic layer 40.

Conductive layers 38 for applying a sensing current to the laminate 16 are deposited on the bias layers 36.

Bias underlying layers 35 are provided between the bias layers 36 and the lower gap layer 164 and between the bias layers 36 and both sides 16A of the laminate 16.

Intermediate layers 37 are provided between the bias layers 36 and the conductive layers 38.

The bias underlying layer 35, the bias layer 36, the intermediate layer 37, and the conductive layer 38 are composed of the same materials as those of the bias underlying layer 6A, the bias layer 6B, the intermediate layer 6C, and the conductive layer 8 which are described in the first or second embodiment.

The antiferromagnetic layer 50 is preferably composed of a PtMn alloy in the same way as in the previous embodiments. The antiferromagnetic layer 50 is composed of an X—Mn alloy or an X'—Mn alloy described in the first and second embodiments.

The pinned magnetic layer 45 includes a nonmagnetic intermediate layer 48 and a first pinned magnetic layer 46 and a second pinned magnetic layer 47 sandwiching the nonmagnetic intermediate layer 48. The first pinned magnetic layer 46 is provided at the antiferromagnetic layer 50 side of the nonmagnetic intermediate layer 48 and in contact with the antiferromagnetic layer 50, and the second pinned magnetic layer 47 is provided at the nonmagnetic conductive layer 29 side of the nonmagnetic intermediate layer 48 and in contact with the nonmagnetic conductive layer 29.

An exchange coupling magnetic field (exchange anisotropic magnetic field) is produced at the interface between the first pinned magnetic layer 46 and the antiferromagnetic layer 50, and the magnetization direction of the first pinned magnetic layer 46 is pinned in a direction opposite to the Y direction in the drawing.

The thickness of the second pinned magnetic layer 47 is larger than the thickness of the first pinned magnetic layer 46.

The magnetization direction of the first pinned magnetic layer 46 is pinned in the direction opposite to the Y direction due to the exchange coupling magnetic field with the antiferromagnetic layer 50, and the magnetization direction of the second pinned magnetic layer 47 is pinned in the Y direction because the second pinned magnetic layer 47 is antiferromagnetically coupled with the first pinned magnetic layer 46.

Since the magnetization directions of the first pinned magnetic layer 46 and the second pinned magnetic layer 47 are antiparallel to each other, the magnetic moment of the first pinned magnetic layer 46 and the magnetic moment of the second pinned magnetic layer 47 cancel out each other. However, since the thickness of the second pinned magnetic layer 47 is slightly larger than that of the first pinned magnetic layer 46, the spontaneous magnetization of the pinned magnetic layer 45 itself slightly remains, thus being in a ferrimagnetic state. The spontaneous magnetization is amplified by an exchange coupling magnetic field with the antiferromagnetic layer 50, and the magnetization direction of the pinned magnetic layer 45 is pinned in the Y direction.

The first pinned magnetic layer 46 and the second pinned magnetic layer 47 are composed of antiferromagnetic materials, and materials similar to those for the first pinned magnetic layer 3A and the second pinned magnetic layer 3C described in the first or second embodiment are used. Preferably, the first pinned magnetic layer 46 and the second pinned magnetic layer 47 are composed of the same material.

The nonmagnetic intermediate layer 48 is composed of a nonmagnetic material, and the same materials for the nonmagnetic intermediate layer 3B described in the second embodiment are used for the nonmagnetic intermediate layer 48.

The nonmagnetic conductive layer 29 is composed of the similar material to that for the nonmagnetic conductive layer 4 described in the first or second embodiment.

As shown in FIGS. 6 and 7, the free magnetic layer 40 includes a nonmagnetic intermediate layer 43 and a first free magnetic layer 41 and a second free magnetic layer 42 sandwiching the nonmagnetic intermediate layer 43. The first free magnetic layer 41 is provided at the back layer 62 side of the nonmagnetic intermediate layer 43 and in contact with the back layer 62, and the second free magnetic layer 42 is provided at the nonmagnetic conductive layer 29 side of the nonmagnetic intermediate layer 43 and in contact with the nonmagnetic conductive layer 29.

The first free magnetic layer 41 is composed of a ferromagnetic material, such as an NiFe alloy, Co, a CoNiFe alloy, a CoFe alloy, or a CoNi alloy. Preferably, the first free magnetic layer 41 is composed of an NiFe alloy.

The nonmagnetic intermediate layer 43 is composed of a nonmagnetic material. Preferably, the nonmagnetic intermediate layer 43 is composed of one material selected from the group consisting of Ru, Rh, Ir, Cr, Re, and Cu, or an alloy thereof, and more preferably, is composed of Ru.

The second free magnetic layer 42 includes a diffusion-inhibiting layer 42A and a ferromagnetic layer 42B. The diffusion-inhibiting layer 42A is composed of a ferromagnetic material, such as Co. The diffusion-inhibiting layer 42A prevents interdiffusion between the ferromagnetic layer 42B and the nonmagnetic conductive layer 29.

The ferromagnetic layer 42B is composed of a ferromagnetic material, such as an NiFe alloy, Co, a CoNiFe alloy, a CoFe alloy, or a CoNi alloy, and preferably, is composed of an NiFe alloy.

Additionally, the second free magnetic layer 42 may be single-layered.

The thickness $t_2$ of the second free magnetic layer 42 is larger than the thickness $t_1$ of the first free magnetic layer 41.

The thickness $t_2$ of the second free magnetic layer 42 is preferably in the range from 2.5 to 4.5 nm. If the thickness $t_2$ of the second free magnetic layer 42 is out of the range described above, the rate of magnetoresistance change of the spin-valve thin-film magnetic element cannot be increased, which is not desirable.

The thickness $t_1$ of the first free magnetic layer 41 is preferably in the range from 0.5 to 2.5 nm.

When the saturation magnetization of the first free magnetic layer 41 and the saturation magnetization of the second free magnetic layer 42 are set at $M_1$ and $M_2$, respectively, the magnetic thickness of the first free magnetic layer 41 and the magnetic thickness of the second free magnetic layer 42 are $M_1 \cdot t_1$ and $M_2 \cdot t_2$, respectively.

Since the second free magnetic layer 42 includes the diffusion-inhibiting layer 42A and the ferromagnetic layer 42B, the magnetic thickness $M_2 \cdot t_2$ of the second free magnetic layer 42 is the sum of the magnetic thickness $M_{21} \cdot t_{21}$ of the diffusion-inhibiting layer 42A and the magnetic thickness $M_{22} \cdot t_{22}$ of the ferromagnetic layer 42B.

That is, the following equation is satisfied:

$$M_2 \cdot t_2 = M_{21} \cdot t_{21} + M_{22} \cdot t_{22}$$

where $M_{21}$ and $t_{21}$ represent the saturation magnetization and the thickness of the diffusion-inhibiting layer 42A, respectively, and $M_{22}$ and $t_{22}$ represent the saturation magnetization and the thickness of the ferromagnetic layer 42B, respectively.

For example, when the diffusion-inhibiting layer 42A is composed of Co and the ferromagnetic layer 42B is composed of an NiFe alloy, the saturation magnetization $M_{21}$ of the diffusion-inhibiting layer 22A is larger than the saturation magnetization $M_{22}$ of the ferromagnetic layer 22B.

The free magnetic layer 40 is constructed so that the magnetic thicknesses of the first free magnetic layer 41 and the second free magnetic layer 42 satisfy the relationship $M_2 \cdot t_2 > M_1 \cdot t_1$.

The first free magnetic layer 41 and the second free magnetic layer 42 are antiferromagnetically coupled with each other. That is, when the magnetization direction of the second free magnetic layer 42 is aligned in the X1 direction by the bias layers 36, the magnetization direction of the first free magnetic layer 41 is aligned in a direction opposite to the X1 direction.

Since the magnetic thicknesses of the first and second free magnetic layers 41 and 42 satisfy the relationship $M_2 \cdot t_2 > M_1 \cdot t_1$, the magnetization of the second free magnetic layer 42 remains, and thus the magnetization direction of the entire free magnetic layer 40 is aligned in the X1 direction. At this state, the effective thickness of the free magnetic layer 40 is $(M_2 \cdot t_2 - M_1 \cdot t_1)$.

As described above, the first free magnetic layer 41 and the second free magnetic layer 42 are antiferromagnetically coupled so that the magnetization directions of the individual layers are antiparallel to each other, and the magnetic thicknesses thereof satisfy the relationship $M_2 \cdot t_2 > M_1 \cdot t_1$, and therefore, the first and second free magnetic layers 41 and 42 are in a synthetic ferrimagnetic state (synthetic ferri-free).

Consequently, the magnetization directions of the free magnetic layer 40 and the pinned magnetic layer 45 are perpendicular to each other.

In the spin-valve thin-film magnetic element GMR3 in this embodiment, when the magnetization direction of the free magnetic layer 40 aligned in the X1 direction is rotated by a fringing magnetic field from a recording medium, such as a hard disk, the electrical resistance changes due to the relationship with the magnetization of the pinned magnetic layer 45 which is pinned in the Y direction, and the fringing magnetic field from the recording medium is detected by a voltage change based on the change in the electrical resistance.

Since the magnetic thicknesses of the first free magnetic layer 41 and the second free magnetic layer 42 have the relationship $M_2 \cdot t_2 > M_1 \cdot t_1$, it is possible to increase the spin flop magnetic field of the free magnetic layer 40. Consequently, the ferrimagnetic state of the free magnetic layer 40 is maintained in a larger magnetic field, and thus the ferrimagnetic state of the free magnetic layer 40 is stably maintained.

The back layer 62 is formed on the free magnetic layer 40 at the side opposite to the surface in contact with the nonmagnetic conductive layer 29, namely, the back layer 62 is in contact with the first free magnetic layer 41.

The back layer 62 is composed of the same material as that for the back layer 5A described in the first or second embodiment. The thickness of the back layer 62 is preferably 10 to 30 Å, and more preferably, 12 to 20 Å, for the same reason as described with respect to the back layer 5A in the first and second embodiments.

In the spin-valve thin-film magnetic element GMR3, in the same manner as that in the first or second embodiment, the rate of magnetoresistance change can be improved due to the spin filter effect by the back layer 62.

The spin filter effect of the back layer 62 is the same as the spin filter effect in the spin-valve thin-film magnetic element GMR1 described in the first embodiment.

That is, spin-up conduction electrons moving from the nonmagnetic conductive layer 29 to the free magnetic layer 40 can be transported to the back layer 62, and the mean free path of the spin-up conduction electrons can be extended. When the back layer 62 is formed on the underlying layer 17, if the back layer 62 is composed of at least one metal selected from the group consisting of Ru, Pt, Ir, Rh, Pd, Os, and Cr, the back layer 62 is oriented on the Ta underlying layer 17 with satisfactory crystal lattice matching. Because of the orientation with satisfactory crystal lattice matching, irregularities of the back layer 62 are decreased and the surface roughness is decreased, and thereby, the free magnetic layer 40, the nonmagnetic conductive layer 29, and the antiferromagnetic layer 50 can be deposited on the back layer 62 with uniform thicknesses. Consequently, the rate of resistance change ($\Delta R/R$) is improved, the coercive force of the free magnetic layer 40 is reduced, and thus the magnetization of the free magnetic layer 40 is rotated with a high sensitivity in response to an external magnetic field. The other advantages which are the same as those in the spin-valve thin-film magnetic elements in the first and second embodiments described above are also obtained in this embodiment.

As described above, in the spin-valve thin-film magnetic element GMR3 in this embodiment, in the same manner as that in the previous embodiments, the mean free path of the spin-up electrons can be extended, and thus a difference in mean free path from the spin-down electrons is increased, and the rate of magnetoresistance change of the spin-valve thin-film magnetic element GMR3 is improved.

Fourth Embodiment

Next, a spin-valve thin-film magnetic element in a fourth embodiment of the present invention will be described.

Figure 8:
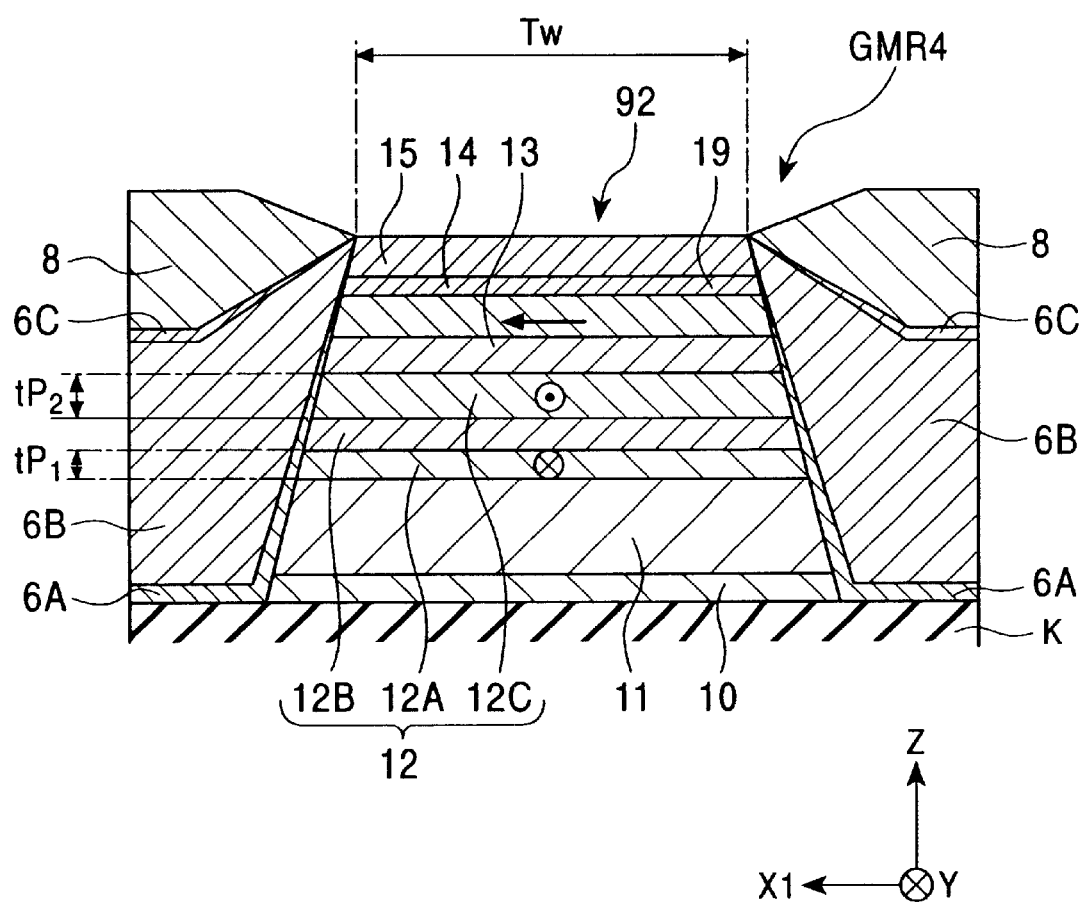
FIG. 8 is a sectional view of a spin-valve thin-film magnetic element in a fourth embodiment of the present invention, viewed from a surface facing a recording medium.

FIG. 8 is a sectional view of a spin-valve thin-film magnetic element GMR4 in the fourth embodiment, viewed from a surface facing a recording medium.

The spin-valve thin-film magnetic element GMR4 is one type of giant magnetoresistive element using a giant magnetoresistance effect. The spin-valve thin-film magnetic element GMR4 is provided on the trailing side of a floating-type slider provided on a hard disk apparatus, etc., and detects a recorded magnetic field from a hard disk, etc. The magnetic recording medium, such as a hard disk, travels in the Z direction in the drawing, and a fringing magnetic field from the magnetic recording medium is directed in the Y direction.

The spin-valve thin-film magnetic element GMR4 in this embodiment is a bottom-type single spin-valve thin-film magnetic element which includes an antiferromagnetic layer, a pinned magnetic layer, a nonmagnetic conductive layer, and a free magnetic layer.

As shown in FIG. 8, an underlying layer 10 is formed on a substrate K, an antiferromagnetic layer 11 is formed on the underlying layer 10, and a pinned magnetic layer 12 with a three-layered structure is formed on the antiferromagnetic layer 11.

A nonmagnetic conductive layer 13 composed of Cu or the like is formed on the pinned magnetic layer 12, and a free magnetic layer 14 is formed on the nonmagnetic conductive layer 13. A back layer 19 is formed on the free magnetic layer 14, and a protective layer 15, which is composed of at least one metal selected from the group consisting of Ru, Pt, Ir, Rh, Pd, Os, and Cr, is formed further thereon. When the protective layer 15 has a single-layered structure, one elemental metal selected from the above or an alloy of at least two elemental metals selected from the above is used for the protective layer 15. When the protective layer 15 has a multi-layered structure, preferably, the multi-layered structure includes elemental metal layers, includes alloy layers, each alloy layer being composed of at least two elemental metals, or includes a composite of the elemental metal layer and the alloy layer.

As shown in FIG. 8, the individual layers from the underlying layer 10 to the protective layer 15 constitute a laminate 92 which has a trapezoidal cross-section.

Bias underlying layers 6A, hard bias layers 6B, intermediate layers 6C, and electrode layers 8 are composed of the same materials as those in the first embodiment.

In the top-type spin-valve thin-film magnetic element as shown in FIG. 1 or 5, the shunt current, which corresponds to a sensing current directly flowing through the hard bias layer to the vicinity of the pinned magnetic layer, the nonmagnetic conductive layer, and the free magnetic layer located below the antiferromagnetic layer, namely, to the lower section of the laminate, is increased. In contrast, in the bottom-type spin-valve thin-film magnetic element, it is possible to improve the proportion of the sensing current applied to the laminate without passing through the antiferromagnetic layer having high resistivity.

More specifically, in the spin-valve thin-film magnetic element in this embodiment, preferably, the antiferromagnetic layer 11 has a thickness of approximately 80 to 150 Å in the center of the laminate 92, and is composed of a PtMn alloy. The PtMn alloy has superior corrosion resistance, a higher blocking temperature, and a larger exchange coupling magnetic field (exchange anisotropic magnetic field) in comparison with an NiMn alloy or an FeMn alloy which has been conventionally used as the antiferromagnetic layer.

Instead of the PtMn alloy, the antiferromagnetic layer 11 may be composed of an X—Mn alloy, where X is an element selected from the group consisting of Pd, Ir, Rh, Ru, and Os, or an X'—Pt—Mn alloy, where X' is at least one element selected from the group consisting of Pd, Cr, Ru, Ni, Ir, Rh, Os, Au, Ag, Ne, Ar, Xe, and Kr.

In the PtMn alloy and the X—Mn alloy, the Pt content or the X content is preferably in the range from 37 to 63 atomic %, and more preferably, 47 to 57 atomic %.

In the X'—Pt—Mn alloy, the X'+Pt content is preferably in the range from 37 to 63 atomic %, and more preferably, 47 to 57 atomic %. Furthermore, in the X'—Pt—Mn alloy, the X' content is preferably in the range from 0.2 to 10 atomic %.

However, when X' is at least one element selected from the group consisting of Pd, Ru, Ir, Rh, and Os, the X' content is preferably in the range from 0.2 to 40 atomic %.

By using an alloy having the appropriate composition described above as the antiferromagnetic layer 11 and by carrying out an annealing treatment, an antiferromagnetic layer 11 having a large exchange coupling magnetic field can be obtained. In particular, if the PtMn alloy is used, it is possible to obtain a superior antiferromagnetic layer 11 having an exchange coupling magnetic field of 48 kA/m or more, for example, more than 64 kA/m, and a blocking temperature as high as 380° C.

A first pinned magnetic layer 12A is formed on the antiferromagnetic layer 11, a nonmagnetic intermediate layer 12B is formed on the first pinned magnetic layer 12A, and a second pinned magnetic layer 12C is formed on the nonmagnetic intermediate layer 12B.

The first pinned magnetic layer 12A and the second pinned magnetic layer 12C are composed of, for example, Co, an NiFe alloy, a CoNiFe alloy, or a CoFe alloy.

Arrows in the first pinned magnetic layer 12A and the second pinned magnetic layer 12C shown in FIG. 8 represent the magnitudes and directions of the magnetic moments, and the magnitude of a magnetic moment is determined by a value obtained by multiplying a saturation magnetization (Ms) by a film thickness (t).

The first pinned magnetic layer 12A and the second pinned magnetic layer 12C shown in FIG. 8 are composed of the same material, for example, a Co film, an NiFe alloy, a CoNiFe alloy, or a CoFe alloy, and the thickness $tP_2$ of the second pinned magnetic layer 12C is larger than the thickness $tP_1$ of the first pinned magnetic layer 12A. Thus, the second pinned magnetic layer 12C has a larger magnetic moment than that of the first pinned magnetic layer 12A.

In this embodiment, the first pinned magnetic layer 12A and the second pinned magnetic layer 12C must have different magnetic moments. Therefore, the thickness $tP_1$ of the first pinned magnetic layer 12A may be larger than the thickness $tP_2$ of the second pinned magnetic layer 12C.

As shown in FIG. 8, the first pinned magnetic layer 12A is magnetized in the Y direction, namely, in the direction away from a recording medium (the height direction or the direction of the height of the element), the second pinned magnetic layer 12C is magnetized antiparallel to the magnetization direction of the first pinned magnetic layer 12A.

The first pinned magnetic layer 12A is formed in contact with the antiferromagnetic layer 11, and by performing magnetic annealing (heat treatment), an exchange coupling magnetic field (exchange anisotropic magnetic field) is generated at the interface between the first pinned magnetic layer 12A and the antiferromagnetic layer 11. For example, as shown in FIG. 8, the magnetization of the first pinned magnetic layer 12A is pinned in the Y direction. If the magnetization of the first pinned magnetic layer 12A is pinned in the Y direction, the magnetization of the second pinned magnetic layer 12C, which is opposed to the first pinned magnetic layer 12A with the nonmagnetic intermediate layer 12B therebetween, is pinned antiparallel to the magnetization direction of the first pinned magnetic layer 12A.

In this embodiment, the ratio between the magnetic thickness $tP_1$ of the first pinned magnetic layer 12A and the magnetic thickness $tP_2$ of the second pinned magnetic layer 12C are desirably set in an appropriate range, and the ratio of the magnetic thickness $tP_1$ of the first pinned magnetic layer to the magnetic thickness $tP_2$ of the second pinned magnetic layer is preferably in the range from 0.33 to 0.95 or from 1.05 to 4. If the ratio is within the above range, the exchange coupling magnetic field can be increased. However, even within the above range, if the thicknesses of the first pinned magnetic layer 12A and the second pinned magnetic layer 12C are increased, the exchange coupling magnetic field tends to be decreased. Therefore, in this embodiment, the thicknesses of the first pinned magnetic layer 12A and the second pinned magnetic layer 12C are preferably set appropriately.

By adjusting the film thickness ratio and the film thicknesses appropriately as described above, it is possible to obtain an exchange coupling magnetic field (Hex) of at least 4,000 A/m. Herein, the exchange coupling magnetic field corresponds to the size of an external magnetic field in which the rate of resistance change ($\Delta R/R$) is one half of the maximum $\Delta R/R$, and conceptually includes an exchange coupling magnetic field (exchange anisotropic magnetic field) generated at the interface between the antiferromagnetic layer 11 and the first pinned magnetic layer 12A, an exchange coupling magnetic field (RKKY interaction) generated between the first pinned magnetic layer 12A and the second pinned magnetic layer 12C, and others.

In the spin-valve thin-film magnetic element GMR4 in this embodiment, in the same manner as that in the previous embodiments, the rate of magnetoresistance change can be improved due to the spin filter effect by the back layer 19.

The spin filter effect of the back layer 19 is the same as the spin filter effect in the spin-valve thin-film magnetic element GMR1 described in the first embodiment.

That is, the spin-up conduction electrons moving from the nonmagnetic conductive layer 13 to the free magnetic layer 14 can be transported to the back layer 19, and the mean free path of the spin-up conduction electrons can be further extended.

As described above, in the spin-valve thin-film magnetic element GMR4 in this embodiment, in the same manner as that in the previous embodiments, the mean free path of spin-up conduction electrons can be extended, and thus a difference in mean free path from spin-down electrons is increased, and the rate of magnetoresistance change of the spin-valve thin-film magnetic element GMR4 is improved.

Additionally, when the free magnetic layer 14 is composed of NiFe, thermal diffusion does not easily occur at the interface between the NiFe free magnetic layer 14 and the back layer 19, and the possibility that the interface becomes disordered after heating is decreased. If the protective layer 15 composed of Ta is directly formed on the free magnetic layer 14, diffusion of elements proceeds at the interface between NiFe and Ta, resulting in an increase in the dispersion of magnetic anisotropy, and an increase in the coercive force of the free magnetic layer 14, and a decrease in the rate of resistance change.

In this embodiment, the back layer 19 and the protective layer 15 are separately provided, and each layer is composed of at least one metal selected from the group consisting of Ru, Pt, Ir, Rh, Pd, Os, and Cr. However, one layer which acts both as the back layer 19 and as the protective layer 15 may be used.

Fifth Embodiment

Next, a spin-valve thin-film magnetic element in a fifth embodiment of the present invention will be described.

Figure 9:
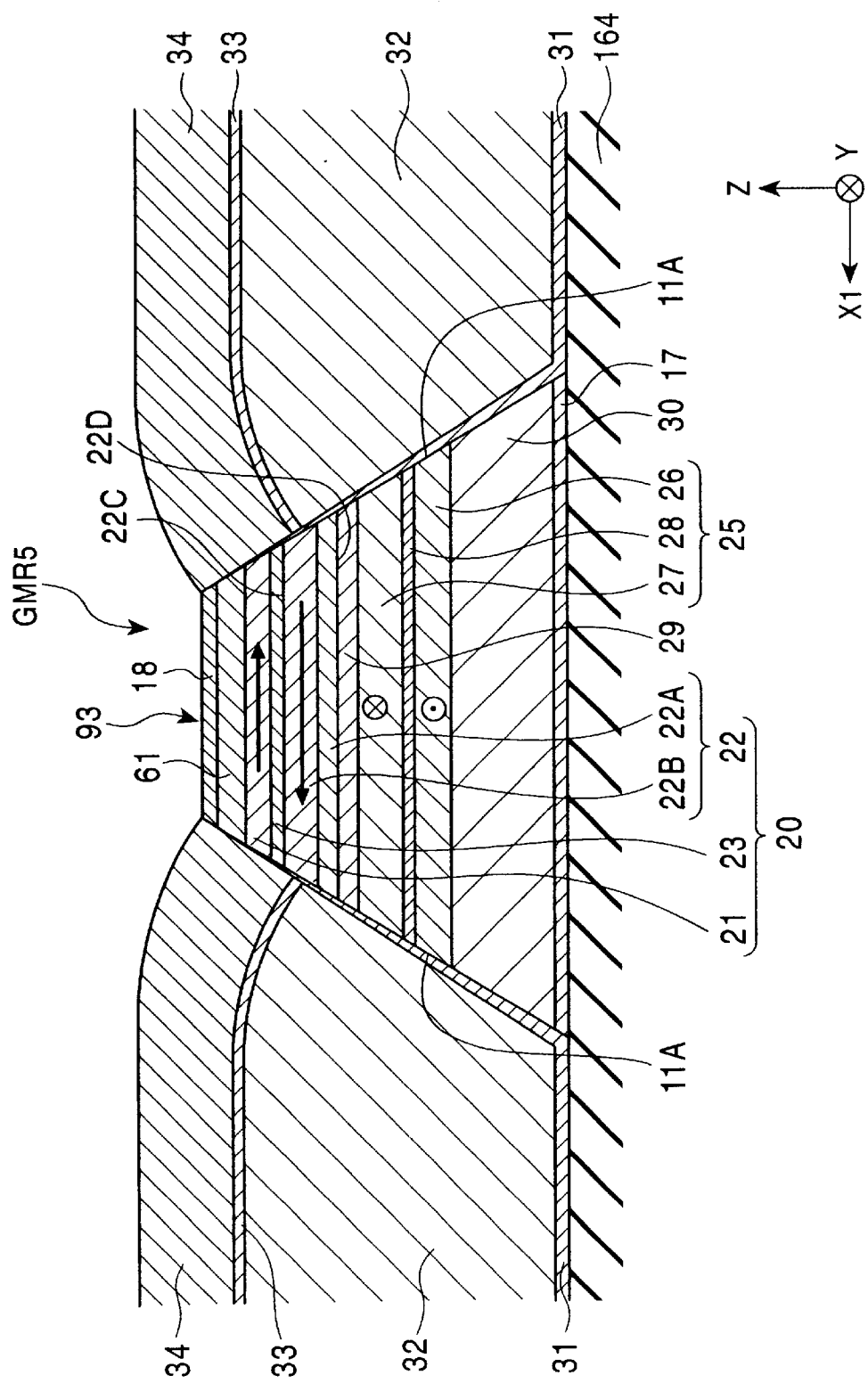
FIG. 9 is a sectional view of a spin-valve thin-film magnetic element in a fifth embodiment of the present invention, viewed from a surface facing a recording medium.
Figure 10:
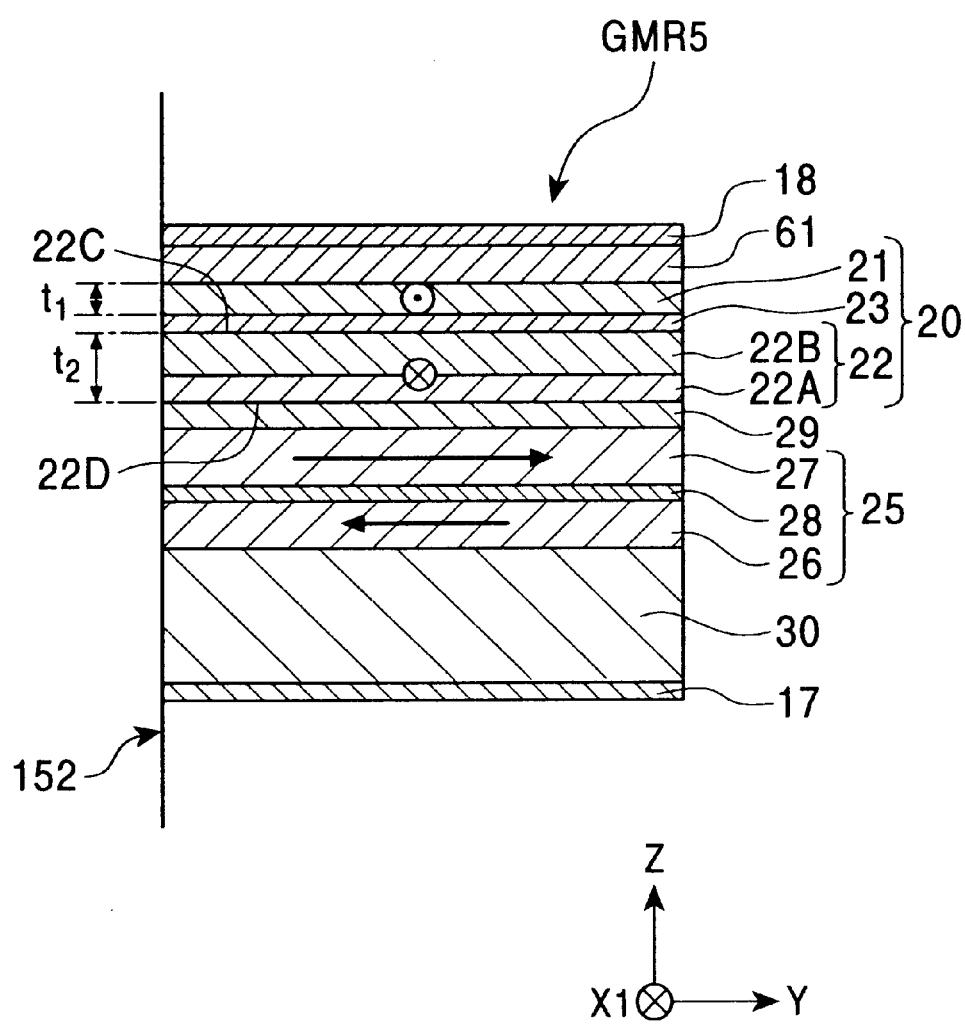
FIG. 10 is a sectional view of a key section of the spin-valve thin-film magnetic element in the fifth embodiment.
Figure 11:
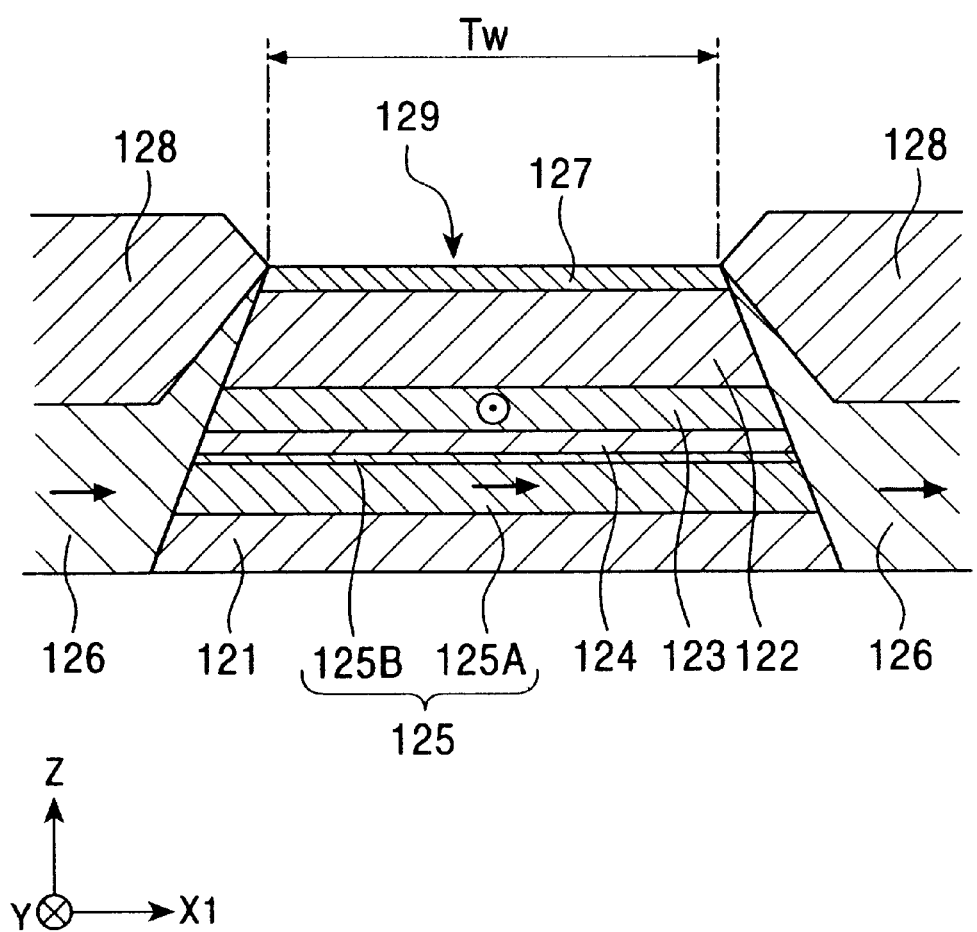
FIG. 11 is a sectional view of a conventional top-type spin-valve thin-film magnetic element, viewed from a surface facing a recording medium.
Figure 12:
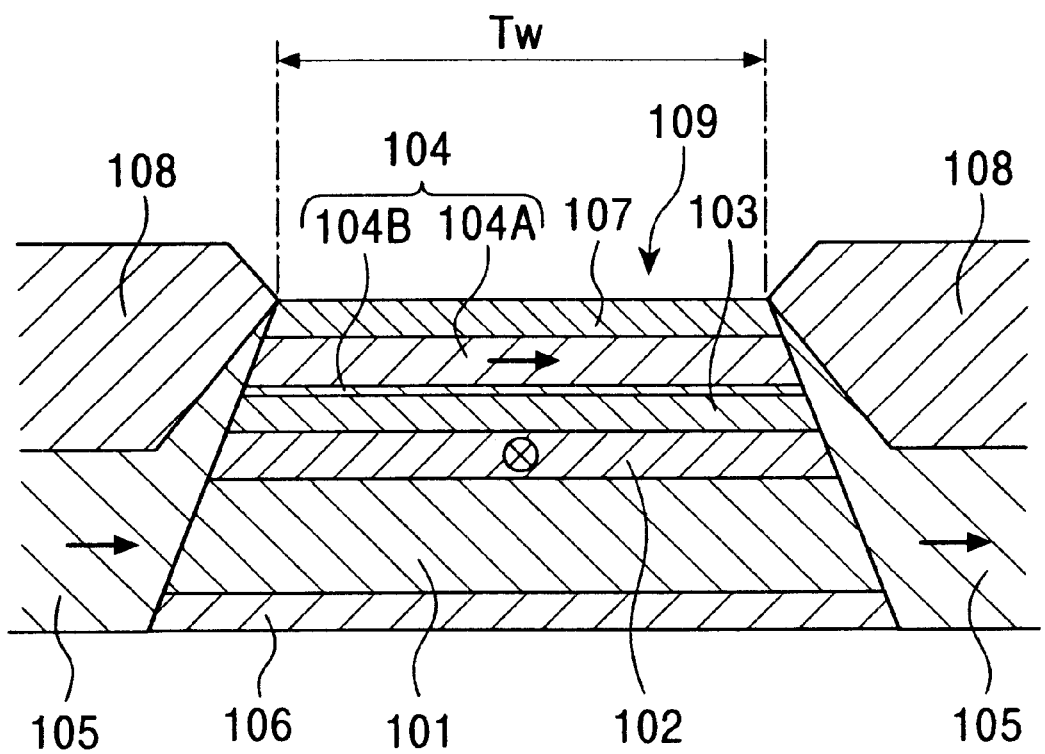
FIG. 12 is a sectional view of a conventional bottom-type spin-valve thin-film magnetic element, viewed from a surface facing a recording medium.

FIG. 9 is a sectional view of a spin-valve thin-film magnetic element GMR5 in the fifth embodiment, viewed from a surface facing a magnetic recording medium, and FIG. 10 is a sectional view of the spin-valve thin-film magnetic element GMR5, taken in the track-width direction.

In FIGS. 9 and 10, the magnetic recording medium travels in the Z direction, a fringing magnetic field from the magnetic recording medium is directed in the Y direction, and the X1 direction corresponds to the track-width direction of the spin-valve thin-film element GMR5.

The spin-valve thin-film magnetic element GMR5 shown in FIGS. 9 and 10 is a bottom-type single spin-valve thin-film magnetic element, in which an antiferromagnetic layer 30, a pinned magnetic layer 25, a nonmagnetic conductive layer 29, a free magnetic layer 20, a back layer 61, and a protective layer 18 are deposited in that order.

Reference numeral 164 represents a lower gap layer, which corresponds to the substrate in the previous embodiments, composed of $Al_2O_3$ or the like, and reference numeral 17 represents an underlying layer composed of Ta or the like deposited on the lower gap layer 164. The antiferromagnetic layer 30 is deposited on the underlying layer 17, the pinned magnetic layer 25 is deposited on the antiferromagnetic layer 30, the nonmagnetic conductive layer 29 composed of Cu or the like is deposited on the pinned magnetic layer 25, the free magnetic layer 20 is deposited on the nonmagnetic conductive layer 29, the back layer 61 is deposited on the free magnetic layer 20, and the protective layer 18 is deposited on the back layer 61.

The individual layers thus deposited, from the underlying layer 17 to the protective layer 18, constitute a laminate 93 having a width corresponding to the track width and having a trapezoidal cross-section.

The free magnetic layer 20 includes a nonmagnetic intermediate layer 23 and first and second free magnetic layers 21 and 22 antiferromagnetically coupled with each other with the nonmagnetic intermediate layer 23 therebetween. The pinned magnetic layer 25 includes a nonmagnetic layer 28 and first and second pinned magnetic layer 26 and 27 sandwiching the nonmagnetic layer 28.

Bias layers 32, for example, composed of a Co—Pt alloy, are formed on both sides in the X1 direction, namely, in the track-width direction, of the laminate 93. The bias layers 32 are joined to both sides 11A of the laminate 93, and in particular, as shown in FIG. 9, the bias layers abut on both sides of the antiferromagnetic layer 30 to the second free magnetic layer 22.

The magnetization of the second free magnetic layer 22 is aligned in the X1 direction. The magnetization of the first free magnetic layer 21 is aligned in a direction opposite to the X1 direction.

Conductive layers 34 composed of Cr, Ta, Cu, Au, or the like are deposited on the bias layers 32.

That is, the conductive layers 34 are formed while being joined to both sides 11A of the laminate 93 located above the bias layers 32.

The conductive layers 34 apply a sensing current to the laminate 93.

Between the bias layers 32 and the lower gap layer 164 and between the bias layers 32 and the laminate 93, bias underlying layers 31 composed of a nonmagnetic metal, such as Cr, are provided.

By forming the bias layers 32 on the bias underlying layers 31 composed of Cr which has a body-centered cubic (bcc) crystal structure, the coercive force and the squareness ratio of the bias layers 32 are increased, and thus a bias magnetic field required for aligning the second magnetic layer 22 in a single-domain state can be increased.

Between the bias layers 32 and the conductive layers 34, intermediate layers 33 composed of a nonmagnetic metal, such as Ta or Cr, are provided.

When Cr is used as the conductive layers 34, by providing Ta intermediate layers 33, the intermediate layers 33 function as diffusion barriers in the subsequent thermal process, such as the resist-hardening step, and thus the degradation of magnetic properties of the bias layers 32 can be prevented.

When Ta is used as the conductive layers 34, by providing Cr intermediate layers 33, the crystal structure of Ta deposited on Cr can be easily set as the body-centered cubic structure having a lower resistance.

The antiferromagnetic layer 30, the pinned magnetic layer 25, and the free magnetic layer 20 are composed of the similar materials to those for the antiferromagnetic layer 50, the pinned magnetic layer 45, and the free magnetic layer 40 described in the third embodiment. The laminate 93 shown in FIG. 9 has the structure in which the individual layers are deposited in reversed order as compared with the laminate 16 shown in FIG. 6. That is, the first pinned magnetic layer 27, the nonmagnetic intermediate layer 28, and the second pinned magnetic layer 28 constituting the pinned magnetic layer 25 are equivalent to the first pinned magnetic layer 46, the nonmagnetic intermediate layer 48, and the second pinned magnetic layer 47 in the third embodiment, respectively. The first free magnetic layer 21, the nonmagnetic intermediate layer 23, and the second free magnetic layer 22 constituting the free magnetic layer 20 are equivalent to the first free magnetic layer, nonmagnetic intermediate layer, the second magnetic layer in the third embodiment, respectively.

In the spin-valve thin-film magnetic element shown in FIGS. 9 and 10, in the same way as the spin-valve thin-film magnetic element shown in FIG. 6, the back layer 61 is composed of at least one metal selected from the group consisting of Ru, Pt, Ir, Rh, Pd, Os, and Cr, and an protective layer 18 similar to that in the previous embodiment is formed thereon as necessary.

In this embodiment, the back layer 61 formed on the free magnetic layer 20 may also be used as the protective layer 18, or the protective layer 18 may be further provided on the back layer 61.

In the spin-valve thin-film magnetic element GMR5 in this embodiment, in the same manner as that in the previous embodiments, the rate of magnetoresistance change can be improved due to the spin filter effect by the back layer 61.

The spin filter effect of the back layer 61 is the same as the spin filter effect in the spin-valve thin-film magnetic element GMR1 described in the first embodiment.

That is, the spin-up conduction electrons moving from the nonmagnetic conductive layer 29 to the free magnetic layer 20 can be transported to the back layer 61, and the mean free path of the spin-up conduction electrons can be further extended.

As described above, in the spin-valve thin-film magnetic element GMR5 in this embodiment, in the same manner as that in the previous embodiments, the mean free path of the spin-up conduction electrons can be extended, and thus a difference in the mean free path from the spin-down electrons is increased, and the rate of magnetoresistance change of the spin-valve thin-film magnetic element GMR5 is improved.

Additionally, when the first free magnetic layer 21 of the free magnetic layer 20 is composed of NiFe, thermal diffusion does not easily occur at the interface between the NiFe first free magnetic layer 21 and the back layer 61, and the possibility that the interface becomes disordered after heating is decreased. If a protective layer composed of Ta is directly formed on the first free magnetic layer 21, diffusion of elements proceeds at the interface between NiFe and Ta, resulting in an increase in the dispersion of magnetic anisotropy, and an increase in the coercive force of the free magnetic layer 20, and a decrease in the rate of magnetoresistance change.

EXAMPLES

With respect to a synthetic-ferri-pinned top-type spin-valve thin-film magnetic element of an example of the present invention, in which a back layer composed of Ru was formed under a free magnetic layer, and an underlying layer composed of Ta was used, the rate of magnetoresistance change ($\Delta R/R$) and the coercive force of the free magnetic layer were measured. As a comparative example, a synthetic-ferri-pinned top-type spin-valve thin-film magnetic element, in which a back layer composed of Cu was provided on an underlying layer of Ta, was fabricated, and the rate of magnetoresistance change and the coercive force of the free magnetic layer were measured.

The synthetic-ferri-pinned top-type spin-valve thin-film magnetic elements used for testing had the same layered structure as that in the second embodiment shown in FIG. 5.

The laminate of the spin-valve element of the example had the following structure, in which the layers are deposited in that order: underlying layer Ta (30 Å)/back layer Ru (20 Å)/free magnetic layer CoFe (30 Å)/nonmagnetic conductive layer (27 Å)/second pinned magnetic layer CoFe (25 Å)/nonmagnetic intermediate layer Ru (8.5 Å)/first pinned magnetic layer CoFe (15 Å)/antiferromagnetic layer PtMn (200 Å)/protective layer Ta (20 Å). As the substrate, an Si substrate body coated with an $Al_2O_3$ film was used. Bias layers composed of CoPt were formed on both sides of the laminate, electrode layers were composed of Cr or Au, bias underlying layers were composed of Cr, and electrode underlying layers were composed of Ta.

As another example, a laminate of a spin-valve element was fabricated with the following structure: underlying layer Ta (30 Å)/back layer Ru (10 Å)/back layer Cu (10 Å)/free magnetic layer CoFe (30 Å)/nonmagnetic conductive layer (27 Å)/second pinned magnetic layer CoFe (25 Å)/nonmagnetic intermediate layer Ru (8.5 Å)/first pinned magnetic layer CoFe (15 Å)/antiferromagnetic layer PtMn (200 Å)/protective layer Ta (20 Å).

As another comparative example, a laminate of a bottom spin-valve thin-film magnetic element provided with a back layer (spin filter layer) was fabricated with the following structure: Ta (30 Å)/PtMn (200 Å)/CoFe (15 Å)/Ru (8 Å)/CoFe (25 Å)/Cu (27 Å)/CoFe (30 Å)/Cu (20 Å)/Ta (20 Å). Furthermore, as another comparative example, a laminate was fabricated with the following structure: underlying layer Ta (30 Å)/back layer Cu (10 Å)/Ru (10 Å)/free magnetic layer CoFe (30 Å)/nonmagnetic conductive layer (27 Å)/second pinned magnetic layer CoFe (25 Å)/nonmagnetic intermediate layer Ru (8.5 Å)/first pinned magnetic layer CoFe (15 Å)/antiferromagnetic layer PtMn (200 Å)/protective layer Ta (20 Å).

The same bias layers, electrode layers, bias underlying layers, and electrode underlying layers as those described in the previous example were provided on both sides of the laminates.

The spin-valve thin-film magnetic elements with the various structures described above were subjected to trackwidth annealing treatment at 210° C. for approximately 60 minutes, and the rate of resistance change ($\Delta R/R$) and the coercive force of the free magnetic layer were measured. The results thereof are shown in Table 1 below.

TABLE 1

| Underlying Layer/Back Layer | $\Delta R/R$ | Coercive Force of Free Magnetic Layer ($H_{cf}$) |
|---|---|---|
| Ta/Ru/Cu | 8.51% | 136 A/m (1.7 Oe) |
| Ta/Ru | 9.09% | 96 A/m (1.2 Oe) |
| Ta/Cu | 8.29% | 424 A/m (5.3 Oe) |
| Ta/Cu/Ru | 6.64% | 184 A/m (2.3 Oe) |
| Bottom spin-valve thin-film magnetic element provided with back layer | 8.60% | 608 A/m (7.6 Oe) |

As is obvious from Table 1, when Ta was used for the underlying layer, by depositing the Ru back layer on the Ta underlying layer, the rate of resistance change ($\Delta R/R$) was improved and the coercive force of the free magnetic layer was decreased as compared with the case in which the Cu back layer was deposited on the Ta underlying layer.

In particular, in the structure using the Ru back layer, $\Delta R/R$ was increased by approximately 10% and the coercive force of the free magnetic layer was decreased by approximately 77%, in comparison with the structure using the Cu back layer. As described above, since the coercive force of the free magnetic layer can be greatly reduced in accordance with the present invention, obviously the reversal of the magnetization of the free magnetic layer can be performed stably, and significantly great advantages are achieved in terms of ΔR/R and the coercive force.

With respect to the laminate in which Ru was deposited on the Ta underlying layer with Cu therebetween, ΔR/R was greatly decreased. When this laminate was observed using a transmission electron microscope (TEM), although the TEM image was likely to have a contract because Ru was interposed between Cu and CoFe, it was found that the interface became disordered so that the individual layers could not be distinguished from each other and that the crystallinity of the Cu layer on the Ta underlying layer was significantly inferior. In contrast, with respect to the Ta/Ru layered structure, it was easily confirmed by the TEM image that the crystallinity of the Ru layer on the Ta underlying layer was satisfactory.

What is claimed is:

1. A spin-valve thin-film magnetic element comprising:
    a substrate;
    an antiferromagnetic layer;
    a pinned magnetic layer in contact with the antiferromagnetic layer, the magnetization direction of the pinned magnetic layer being pinned by an exchange coupling magnetic field with the antiferromagnetic layer;
    a nonmagnetic layer in contact with the pinned magnetic layer;
    a free magnetic layer in contact with the nonmagnetic conductive layer, the magnetization direction of the free magnetic layer being aligned in a direction perpendicular to the magnetization direction of the pinned magnetic layer; and
    a back layer comprising a nonmagnetic conductive material formed in contact with the free magnetic layer at the opposite side of the nonmagnetic conductive layer,
    wherein the back layer comprises at least one metal selected from the group consisting of Ru, Pt, Ir, Rh, Pd, Os, and Cr, and
    wherein the pinned magnetic layer comprises a nonmagnetic intermediate sub-layer, and a first pinned magnetic sub-layer and a second pinned magnetic sub-layer sandwiching the nonmagnetic intermediate sub-layer, the magnetization direction of the first pinned magnetic sub-layer is antiparallel to the magnetization direction of the second pinned magnetic sub-layer, and the first pinned magnetic sub-layer and the second pinned magnetic sub-layer are in a ferrimagnetic state.

2. A spin-valve thin-film magnetic element according to claim 1, wherein at least the back layer, the free magnetic layer, the nonmagnetic conductive layer, the pinned magnetic layer, and the antiferromagnetic layer are deposited in that order on the substrate.

3. A spin-valve thin-film magnetic element according to claim 1, wherein at least the antiferromagnetic layer, the pinned magnetic layer, the nonmagnetic conductive layer, the free magnetic layer, and the back layer are deposited in that order on the substrate.

4. A spin-valve thin-film magnetic element according to claim 2, wherein the back layer is deposited on the substrate with an underlying layer comprising Ta therebetween.

5. A spin-valve thin-film magnetic element according to claim 3, wherein a protective layer is deposited above the free magnetic layer on the side opposite from the substrate, the protective layer comprising at least one metal selected from the group consisting of Ru, Pt, Ir, Rh, Pd, Os, and Cr.

6. A spin-valve thin-film magnetic element according to claim 5, wherein the free magnetic layer comprises NiFe, and the protective layer has a thermal-diffusion-inhibiting function.

7. A spin-valve thin-film magnetic element according to claim 1 further comprising:
    bias layers for aligning the magnetization direction of the free magnetic layer in the direction perpendicular to the magnetization direction of the pinned magnetic layer, the bias layers being formed on both sides of a laminate including at least the antiferromagnetic layer, the pinned magnetic layer, the nonmagnetic conductive layer, the free magnetic layer, and the back layer; and
    electrode layers for applying a sensing current to the laminate, the electrode layers being formed on the bias layers.

8. A spin-valve thin-film magnetic element according to claim 1, wherein the free magnetic layer comprises a nonmagnetic intermediate sub-layer, and a first free magnetic sub-layer and a second free magnetic sub-layer sandwiching the nonmagnetic intermediate sub-layer, the magnetization direction of the first free magnetic sub-layer is antiparallel to the magnetization direction of the second free magnetic sub-layer, and the first free magnetic sub-layer and the second free magnetic sub-layer are in a ferrimagnetic state.

9. A spin-valve thin-film magnetic element according to claim 1, wherein the antiferromagnetic layer comprises one of an X—Mn alloy and a Pt—Mn—X' alloy, where X is an element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

10. A spin-valve thin-film magnetic element according to claim 9, wherein the antiferromagnetic layer comprises the X—Mn alloy, and the X content is in the range from 37 to 63 atomic %.

11. A spin-valve thin-film magnetic element according to claim 9, wherein the antiferromagnetic layer comprises the X'—Pt—Mn alloy, and the X'+Pt content is in the range from 37 to 63 atomic %.

12. A spin-valve thin-film magnetic element according to claim 1, wherein a Co layer is disposed on at least one of the free magnetic layer side of the nonmagnetic conductive layer and the pinned magnetic layer side of the nonmagnetic conductive layer.

13. A spin-valve thin-film magnetic element comprising:
    a substrate;
    an antiferromagnetic layer;
    a pinned magnetic layer in contact with the antiferromagnetic layer, the magnetization direction of the pinned magnetic layer being pinned by an exchange coupling magnetic field with the antiferromagnetic layer;
    a nonmagnetic layer in contact with the pinned magnetic layer;
    a free magnetic layer in contact with the nonmagnetic conductive layer, the magnetization direction of the free magnetic layer being aligned in a direction perpendicular to the magnetization direction of the pinned magnetic layer; and
    a back layer comprising a nonmagnetic conductive material formed in contact with the free magnetic layer at the opposite side of the nonmagnetic conductive layer,
    wherein the back layer comprises at least two metals selected from the group consisting of Ru, Pt, Ir, Rh, Pd, Os, and Cr.

14. A spin-valve thin-film magnetic element according to claim 13, wherein the back layer has a layered structure comprising a layer comprising at least two metals selected from the group consisting of Ru, Pt, Ir, Rh, Pd, Os, and Cr, and a layer comprising one metal selected from the group consisting of Ru, Pt, Ir, Rh, Pd, Os, and Cr.

15. A spin-valve thin-film magnetic element according to claim 13, wherein the back layer has a layered structure comprising a layer comprising at least two metals selected from the group consisting of Ru, Pt, Ir, Rh, Pd, Os, and Cr, and a layer comprising at least two metals selected from the group consisting of Ru, Pt, Ir, Rh, Pd, Os, and Cr.

16. A spin-valve thin-film magnetic element comprising:

a substrate;

an antiferromagnetic layer;

a pinned magnetic layer in contact with the antiferromagnetic layer, the magnetization direction of the pinned magnetic layer being pinned by an exchange coupling magnetic field with the antiferromagnetic layer;

a nonmagnetic layer in contact with the pinned magnetic layer;

a free magnetic layer in contact with the nonmagnetic conductive layer, the magnetization direction of the free magnetic layer being aligned in a direction perpendicular to the magnetization direction of the pinned magnetic layer; and a back layer comprising a nonmagnetic conductive material formed in contact with the free magnetic layer at the opposite side of the non magnetic conductive layer, wherein the back layer has a layered structure comprising a layer comprising one metal selected from the group consisting of Ru, Pt, Ir, Rh, Pd, Os, and Cr, and a layer comprising one metal selected from the group consisting of Ru, Pt, Ir, Rh, Pd, Os, and Cr.

* * * * *